(12) United States Patent  (10) Patent No.: US 8,559,503 B2
Satou et al.  (45) Date of Patent: Oct. 15, 2013

(54) MOVING IMAGE CODING METHOD, MOVING IMAGE CODING APPARATUS, PROGRAM, AND INTEGRATED CIRCUIT

(75) Inventors: Shinichi Satou, Kanagawa (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 292 days.

(21) Appl. No.: 13/061,216

(22) PCT Filed: Jun. 8, 2010

(86) PCT No.: PCT/JP2010/003812
§ 371 (c)(1),
(2), (4) Date: Feb. 28, 2011

(87) PCT Pub. No.: WO2010/150470
PCT Pub. Date: Dec. 29, 2010

(65) Prior Publication Data
US 2011/0164679 A1  Jul. 7, 2011

(30) Foreign Application Priority Data

Jun. 23, 2009 (JP) ................................. 2009-149199

(51) Int. Cl.
*H04N 13/00* (2006.01)
(52) U.S. Cl.
USPC .................................................. 375/240.03
(58) Field of Classification Search
USPC ........................................................ 375/240
See application file for complete search history.

(56) References Cited

U.S. PATENT DOCUMENTS

| 6,381,254 | B1* | 4/2002 | Mori et al. ..................... 370/537 |
| 6,754,267 | B1 | 6/2004 | Shimanaka |
| 2004/0004959 | A1 | 1/2004 | Itakura |
| 2005/0030369 | A1 | 2/2005 | Ryu |
| 2005/0238243 | A1* | 10/2005 | Kondo et al. ................. 382/239 |
| 2007/0258702 | A1* | 11/2007 | Sugio et al. ................... 386/109 |

FOREIGN PATENT DOCUMENTS

| JP | 2000-083253 | | 3/2000 |
| JP | 2001-160969 | * | 6/2001 |
| JP | 2003-308277 | | 10/2003 |
| JP | 2004-040517 | * | 2/2004 |
| JP | 2005-020731 | | 1/2005 |
| JP | 2005-073218 | | 3/2005 |
| WO | 2006/003808 | | 1/2006 |

OTHER PUBLICATIONS

International Search Report issued Sep. 14, 2010 in International (PCT) Application No. PCT/JP2010/003812.

* cited by examiner

*Primary Examiner* — David Czekaj
*Assistant Examiner* — Md Haque
(74) *Attorney, Agent, or Firm* — Wenderoth, Lind & Ponack, L.L.P.

(57) ABSTRACT

A moving image coding method includes changing at least one of a resolution and a frame rate of an input image, according to a degree of difficulty in coding the input image, and outputting an image to be coded, coding the image outputted in the changing, and transmitting a coded bit stream through a transmission channel, and determining a coding bit rate that is a bit rate of the coded bit stream transmitted through the transmission channel. The moving image coding method also includes selecting a resolution range for determining an upper limit of a resolution of the image to be coded according to the coding bit rate determined in the determining to control the change in the changing so that the resolution of the image to be coded does not exceed the upper limit.

11 Claims, 27 Drawing Sheets

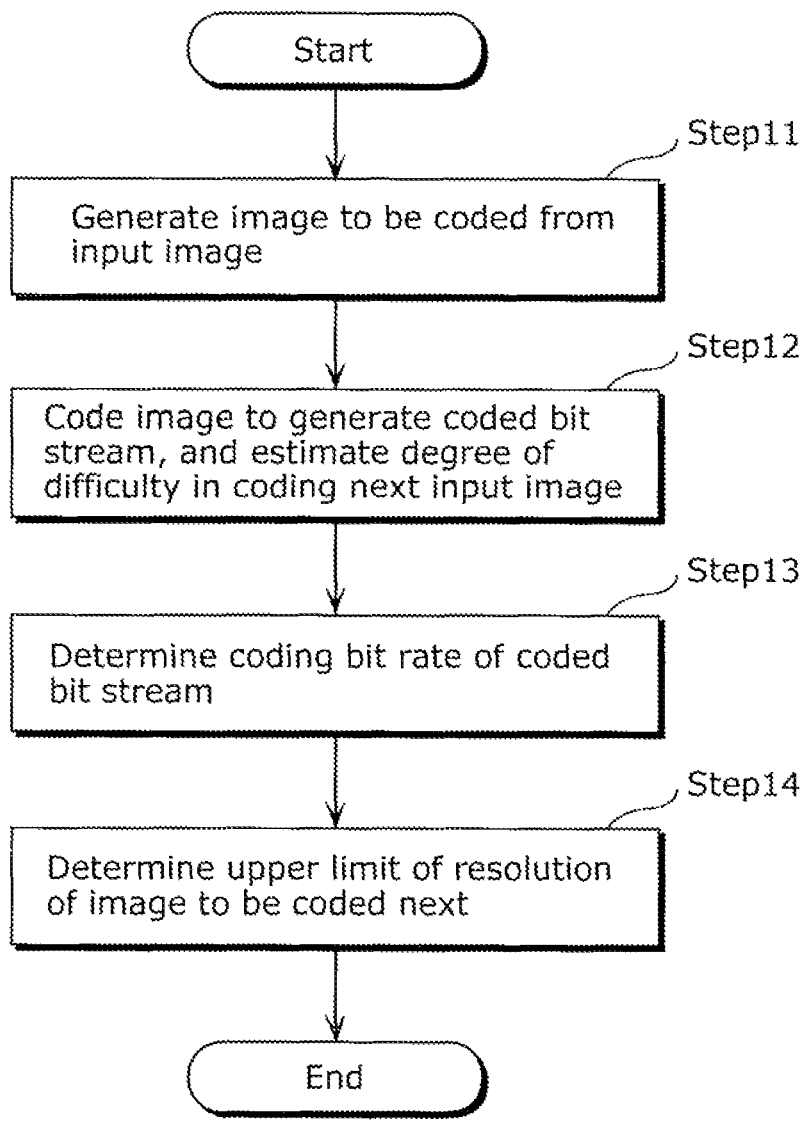

| Bit rate | Minimum resolution | Maximum resolution |
|---|---|---|
| Equal to or larger than Rth0 (high bit rate) | 1280x720 | 1920x1080 |
| Equal to or larger than Rth1 and smaller than Rth0 (medium bit rate) | 704x480 | 1280x720 |
| Smaller than Rth1 (low bit rate) | 352x240 | 704x480 |

FIG. 13

| State ID | Resolution | Frame rate | Transition condition 1 | Transition condition 2 | State transition destination 1 | State transition destination 2 |
|---|---|---|---|---|---|---|
| S11 | 1920x1080 | 60 | QpUth(0) | QpLth(0) | S21 | S11 |
| S21 | 1280x720 | 60 | QpUth(1) | QpLth(1) | S22 | S11 |
| S22 | 1280x720 | 30 | QpUth(2) | QpLth(2) | S32 | S21 |
| S32 | 704x480 | 30 | QpUth(3) | QpLth(3) | S33 | S22 |
| S33 | 704x480 | 20 | QpUth(4) | QpLth(4) | S43 | S32 |
| S43 | 352x240 | 20 | QpUth(5) | QpLth(5) | S44 | S33 |
| S44 | 352x240 | 15 | QpUth(6) | QpLth(6) | S44 | S43 |

MOVING IMAGE CODING METHOD, MOVING IMAGE CODING APPARATUS, PROGRAM, AND INTEGRATED CIRCUIT

TECHNICAL FIELD

The present invention relates to an image coding method and an image coding apparatus, and in particular to an image coding method and an image coding apparatus for adaptively switching between resolutions and between frame rates according to a target bit rate, in accordance with the Moving IMAGE Experts Group (MPEG)-4AVC standard, that is, the ITU-T H.264 standard.

BACKGROUND ART

Recently, with the advent of the age of multimedia which handles audio, images and other pixel values in an integrated manner, conventional information media, such as newspapers, journals, televisions, radios, and telephones, through which information is carried to people, have come under the scope of multimedia. Generally, multimedia refers to a representation in which not only text but also graphics, audio, particularly images, and/or others are simultaneously associated with one another. The information for the above conventional information media must first be digitized before it can be handled as multimedia information.

However, the estimated amount of the multimedia information as digital data is only 1 or 2 bytes per character of text, but 64 Kbits per second of audio (telephone quality), and 100 Mbits or higher per second of video (at current television receiver quality). It is therefore not practical to handle these massive amounts of information in digital form on the above information media. For example, video telephony services are available over Integrated Services Digital Network (ISDN) lines with a transmission speed of 64 Kbit/s to 1.5 Mbit/s, but video for a television and a camera cannot be sent as it is over the ISDN lines.

Data compression therefore becomes essential. Video telephony services, for example, are implemented using video compression techniques standardized in International Telecommunication Union, Telecommunication Standardization Sector (ITU-T) Recommendations H.261 and H.263. Using the data compression techniques defined in MPEG-1, image information can be recorded together with audio information on a conventional audio compact disc (CD).

The Moving Picture Experts Group (MPEG) is an international standard for compressing video signals, and has been standardized by the International Organization for Standardization and the International Electrotechnical Commission (ISO/IEC). MPEG-1 is a standard that enables transmission of a video signal at 1.5 Mbps, that is, compression of information in a television signal approximately to a hundredth part of its original size. The moderate image quality is targeted in MPEG-1 because the transmission speed for MPEG-1 moving images is limited to approximately 1.5 Mbit/s. Therefore, MPEG-2, which has been standardized to meet the demand for higher image quality, enables transmission of a video signal at 2 to 15 Mbit/s to satisfy television broadcast quality.

Furthermore, the working group (ISO/IEC JTC1/SC29/WG11) that has worked on the standardization of MPEG-1 and MPEG-2 has standardized MPEG-4 that achieved a compression rate higher than those of MPEG-1 and MPEG-2. MPEG-4 not only enables coding, decoding, and operating on a per object basis, but also introduces a new capability required in the multimedia age. MPEG-4 achieved a compression rate higher than those of MPEG-1 and MPEG-2, and further enables coding, decoding, and operating on a per object basis.

At first, MPEG-4 had been developed for the purpose of the standardization of a coding method for a lower bit rate. Then, it was extended to a more versatile coding method including a method for coding even interlaced images at a high bit rate. The MPEG-4 AVC (ITU-T H.264) has been standardized as a method for coding an image at a higher compression rate through collaboration between the ISO/IEC and the ITU-T.

Here, an image signal can be consecutive pictures (also referred to as frames or fields) that are groups of pixels at a same time. Since pixels have a strong correlation with adjacent pixels in each picture, pictures are compressed using the correlation in each picture. Furthermore, the consecutive pictures are compressed using a correlation between pixels in different pictures because the consecutive pictures have the strong correlation between pixels.

Here, compression using a correlation between pixels in different pictures and a correlation between pixels in a picture is referred to as inter coding, whereas compression using only the correlation between pixels in a picture without using the correlation between pixels in different pictures is referred to as intra coding. The inter coding that uses the correlation between pictures can achieve a compression rate higher than that of the intra coding.

Furthermore, in accordance with MPEG-1, MPEG-2, MPEG-4, and MPEG-4 AVC (H.264), each image includes blocks (or a macroblock as a generic concept of the blocks) that are groups of pixels in a two-dimensional rectangular area, and the inter coding and the intra coding are switched per block.

On the other hand, with widespread high-speed network environment using Asymsatisfiedric Digital Subscriber Lines (ADSLs) and optical fibers, general households can transmit and receive information at a bit rate over several Mbit/s. Furthermore, it is expected that information can be transmitted and received at several tens of Mbit/s in the next few years.

Thereby, the expectation is that with the image coding technique, not only companies using dedicated lines but also general households will introduce video telephony services and teleconferencing systems that guarantee the television broadcast quality and HDTV broadcast quality.

The high-speed network using an ADSL or an optical fiber is not a bandwidth-guaranteed dedicated network that is expensive and is targeted at companies but a best-effort network that is inexpensive and is to be used in common by users. What is determined in the best-effort network is the upper limit of a sum of bit rates used by the users at the time. Thus, the bit rate available per user decreases at the time when the number of users increases, whereas the bit rate available per user increases at the time when the number of users decreases. In other words, there is a feature that the available bit rate largely changes depending on a time.

Furthermore, moving images includes images that can be very easily compressed, such as a whole-colored solid image (image having the same color and the same brightness on an entire screen). In contrast, there are images that are very difficult to be compressed due to no correlation between pixels, such as white noise. Thus, it is important to stably code moving images that considerably differ in ease of compression, without any substantial image degradation.

Before coding a moving image that is difficult to be compressed, the conventional image coding apparatus converts a resolution thereof to a lower resolution and reduces the number of pixels to be coded (PTL 1).

FIG. 24 is an explanation drawing for describing a conventional moving image coding apparatus. The left column of FIG. 24 illustrates image sizes (resolutions) of an image to be coded, that is, resolutions at which the image is actually coded. On the other hand, the right column of FIG. 24 illustrates respective sizes of images displayed by a display apparatus, where the images are obtained by decoding coded images and enlarging respective sizes of the decoded images.

Here, the images to be coded include an image that is relatively easy to be compressed and an image that is relatively difficult to be compressed. The moving image that is relatively easy to be compressed (top of FIG. 24) is coded without changing the resolution, the coded image is decoded by an image decoding apparatus, and the decoded image is displayed in the original resolution.

In contrast, the moving image that is relatively difficult to be compressed is coded with less number of pixels (lower resolution) after vertically and horizontally reducing the number of pixels (resolution) to ¾ (middle of FIG. 24) or to ½ (bottom of FIG. 24). Furthermore, the display image decoded by the image decoding apparatus is displayed with the number of pixels (resolution) same as that of the original moving image by increasing the resolution by 4/3 times or 2 times.

Even when an image that is difficult to be compressed is coded, coding the less number of pixels (resolution) can prevent the substantial image degradation. However, even when an image having the less number of pixels is enlarged into an image having the larger number of pixels, since it is not possible to achieve the representation over the fineness (minuteness) that can be represented using the less number of pixels that have been coded, the obtained image becomes more blurred than the image that has been coded at the same magnification.

Furthermore, when a moving image that is difficult to be compressed is coded, there is a method of not only changing the resolution of the image, but also controlling a frame rate of the image that is the number of frames per unit time of an image to be coded, and the quantization step when coding per block.

FIG. 25 is a block diagram illustrating a conventional image coding apparatus in which a resolution, a frame rate, and a quantization step are dynamically changed. As illustrated in FIG. 25, the conventional image coding apparatus mainly includes a resolution changing circuit 501, a frame rate changing circuit 502, a moving image coding circuit 503, a quantization step control circuit 506, a frame rate control circuit 507, and a resolution setting circuit 508.

The resolution setting circuit 508 determines the resolution at which an image is coded according to the difficulty in compression as described in PTL 1, and notifies the resolution changing circuit 501 of a resolution signal S64 indicating the resolution of the image to be coded. The resolution changing circuit 501 converts a video signal S60 that is an input from a video input terminal 500 at a predetermined resolution into a video signal S61 having the resolution notified from the resolution setting circuit 508.

The frame rate control circuit 507 notifies the frame rate changing circuit 502 of a frame rate signal S67 indicating the frame rate of the image to be coded. The frame rate changing circuit 502 changes the frame rate of the video signal S61 in which the resolution has been changed into the frame rate notified from the frame rate control circuit 507.

The quantization step control circuit 506 notifies the moving image coding circuit 503 of a quantization step signal S66 indicating the quantization step for quantization by the moving image coding circuit 503. The moving image coding circuit 503 quantizes and codes a video signal S62 in which the frame rate has been changed using the quantization step notified from the quantization step control circuit 506, and outputs a bitstream S63 to a bitstream output terminal 504.

The quantization step control circuit 506 determines the quantization step, based on a target coding bit rate, the code amount of the bitstream S63 outputted from the moving image coding circuit 503, and a value indicated by the frame rate signal S67. Furthermore, the frame rate control circuit 507 determines a frame rate according to a value indicated by the quantization step signal S66 determined by the quantization step control circuit 506.

With such a configuration, the resolution setting circuit 508 determines a resolution according to the difficulty in compressing an image. Furthermore, when the degree of difficulty in compressing an image in which the resolution has been changed is changed, the conventional image coding apparatus dynamically controls the frame rate and the quantization step, and codes the image at a target bit rate.

CITATION LIST

Patent Literature

[PTL 1] Japanese Unexamined Patent Application Publication No. 2001-160969

SUMMARY OF INVENTION

Technical Problem

However, there is a problem with the conventional configuration that when the degree of difficulty in compressing an input image is considerably changed, the image quality is considerably degraded particularly at a low bit rate.

When an image is very easily compressed or when a still image is coded in inter coding, since the image can be coded at a low bit rate, the resolution setting circuit 508 notifies the resolution changing circuit 501 to change the resolution of the image to the maximum resolution. Coding the image at a low bit rate generates only an image that is slightly difficult to be compressed (a person or an object moves), resulting in the large quantization step and occurrence of blurs or blocking artifacts. Furthermore, even when the number of frames to be skipped considerably increases to reduce the frame rate, the correlation between the remaining frames becomes smaller. Thus, the compression effect by the frame skipping is reduced. As a result, since the video is played back in an extreme frame-by-frame mode, there are cases where the video becomes unpleasant without lowering the resolution.

Here, the blocking artifacts or the image quality degradation such as the frame-by-frame playback can be prevented by frequently changing the resolution according to the slight change in the difficulty (movement) in compressing an image. However, when the resolution is frequently changed according to the slight change in the compression difficulty, as a result, frequent change in the blur degree becomes more noticeable as degradation in the image quality.

When the number of accesses increases in the Internet that is one of the best-effort networks, the bit rate that can be transmitted considerably vary according to the time (sometimes a submultiple of the bit rate). Recently, many users operate their personal computers (PC), during the teleconferencing or when using video telephony services, through image coding apparatuses.

When the user downloads a file or browses and/or edits a file in the server, from the PC via the same network, the bit rate available by the image coding apparatus rapidly decreases. Such a rapid change frequently occurs. For example, once the user suspends the operation by the PC, the bit rate rapidly increases.

Under the circumstances that the bit rate that can be transmitted is changed, in addition to the change in the compression difficulty depending on the details of the image, the resolution is frequently switched to another according to the change in the bit rate. Thus, the image quality is unpleasantly degraded.

The present invention has been conceived in view of the conventional problems, and has an object of providing a moving image coding method capable of coding an image with the image quality that does not cause any uncomfortable feeling even when the degree of difficulty in compressing an input image or the target coding bit rate is considerably changed.

Solution to Problem

The moving image coding method according to an aspect of the present invention is a moving image coding method of coding an input image to generate a coded bit stream, and transmitting the coded bit stream through a transmission channel, and the method includes: changing at least one of a resolution and a frame rate of the input image, according to a degree of difficulty in coding the input image, and outputting an image to be coded; coding the image outputted in the changing to generate the coded bit stream, and transmitting the coded bit stream through the transmission channel; determining a coding bit rate that is a bit rate of the coded bit stream transmitted through the transmission channel; and selecting a resolution range for determining an upper limit of a resolution of the image to be coded according to the coding bit rate determined in the determining, wherein when the resolution of the image to be coded is to be increased, a new resolution is determined in the changing so that the resolution of the image to be coded does not exceed the upper limit determined in the selecting.

With the configuration, even when the degree of difficulty in coding an input image is rapidly changed, the resolution is not considerably changed. In particular, the image that has a higher resolution and is difficult to be compressed can be prevented from being coded at a low bit rate. As a result, the subjective degradation in the image quality can be effectively prevented.

In the selecting, a lower limit of the resolution of the image to be coded may be determined according to the coding bit rate determined in the determining, and when the resolution of the image to be coded is to be decreased, a new resolution is determined in the changing so that the new resolution does not fall below the lower limit determined in the selecting.

After changing the resolution of the image to be coded, the resolution of the image to be coded may not be changed again in the changing at least until a predetermined time period has passed or until a predetermined number of input images including the input image have been processed. Immediately after the resolution of an image is changed, the image is coded using intra prediction. Thus, the coding efficiency temporarily decreases. Accordingly, until a predetermined time period required for stabilizing the coding efficiency has passed and/or a predetermined number of input images (frames) have been processed, it is desired that the resolution of the image is not changed again.

The coding bit rate may be determined based on a bit rate that can be transmitted through the transmission channel, the bit rate being obtained by measuring an amount of a coded bit stream that has been actually transmitted and received between a transmitting apparatus and a receiving apparatus. The code amount that has been actually transmitted and received can be obtained by notifying the number of data transmitted from a transmitting apparatus and received by a receiving apparatus or the number of data that cannot be received by the receiving apparatus. The method of determining the coding bit rate is not limited to this method. For example, the coding bit rate may be a fixed value specified by the user.

The moving image coding method may further include: calculating a quantization step such that the coded bit stream has a code amount that enables transmission of the coded bit stream at the coding bit rate determined in the determining, and quantizing the image to be coded using the calculated quantization step in the coding; and calculating a quantization step average value that is an average value of the quantization steps calculated during a predetermined time period in the calculating of a quantization step, wherein the changing includes: determining a resolution and a frame rate of the image to be coded by determining the degree of difficulty in coding the input image based on the quantization step average value calculated in the calculating of a quantization step average value; changing the resolution of the input image to the resolution determined in the determining of a resolution and a frame rate; and changing the frame rate of the input image to the frame rate determined in the determining of a resolution and a frame rate.

The aforementioned "quantization step average value" calculated during a predetermined time period may be an average value between the first frame and the current frame of the image to be coded. Furthermore, since the value of the quantization step becomes unstable during a predetermined period after changing the resolution, the average value does not have to be calculated during the period.

More specifically, in the determining of a resolution and a frame rate, at least one of a first resolution and a second resolution may be held in advance, the first resolution being lower than a resolution determined immediately before, and the second resolution being higher than the resolution, in the changing of the resolution of the input image, the resolution of the input image may be changed to the first resolution, when the quantization step average value calculated in the calculating of a quantization step average value is larger than a predetermined first threshold and when the first resolution that is held is equal to or larger than the lower limit, and in the changing of the resolution of the input image, the resolution of the input image may be changed to the second resolution, when the quantization step average value calculated in the calculating of a quantization step average value is smaller than a predetermined second threshold and when the second resolution that is held is equal to or smaller than the upper limit.

Furthermore, in the determining of a resolution and a frame rate, at least one of a first frame rate and a second frame rate may be held in advance, the first frame rate being lower than a frame rate determined immediately before, and the second frame rate being higher than the frame rate, in the changing of the frame rate of the input image, the frame rate of the input image may be changed to the second frame rate, when the resolution of the input image is changed to the first resolution in the changing of the resolution of the input image, and in the changing of the frame rate of the input image, the frame rate of the input image may be changed to the first frame rate, when the resolution of the input image is changed to the second resolution in the changing of the resolution of the input image.

The resolution has a more significant influence on the coding efficiency and the image quality than the frame rate. Thus, increase in the frame rate according to reduction in the resolution and reduction in the frame rate according to increase in the resolution enable suppression of rapid change in the coding efficiency and the image quality.

Furthermore, in the determining of a resolution and a frame rate, at least one of a first frame rate and a second frame rate may be held in advance, the first frame rate being lower than a frame rate determined immediately before, and the second frame rate being higher than the frame rate, in the changing of the frame rate of the input image, the frame rate of the input image may be changed to the first frame rate, when the quantization step average value calculated in the calculating of a quantization step average value is larger than the predetermined first threshold and the first resolution that is held falls below the lower limit, and in the changing of the frame rate of the input image, the frame rate of the input image may be changed to the second frame rate, when the quantization step average value calculated in the calculating of a quantization step average value is smaller than the predetermined second threshold and the second resolution that is held exceeds the upper limit.

With the configuration, when the "average value of the quantization step" indicating the degree of difficulty in coding an input image is changed, the resolution can be changed within a range set by an upper limit and a lower limit. Furthermore, when the resolution cannot be changed any longer, the frame rate may be changed and adjusted.

The parameter for determining the "degree of difficulty in coding an input image" in the changing is not limited to the quantization step. As long as the parameter indicates a value necessary for deriving the quantization step, other values may be used. For example, the quantization parameter may be used. Alternatively, the quantization step is a set of values that is different for each frequency component. The calculating of a quantization step holds the sets having different magnifications (for example, 32 sets). The value corresponding to the magnification may be used as a parameter for determining the "degree of difficulty in coding an input image".

The moving image coding apparatus according to an aspect of the present invention is a moving image coding apparatus that codes an input image to generate a coded bit stream, and transmits the coded bit stream through a transmission channel, and the apparatus includes: an image converting unit configured to change at least one of a resolution and a frame rate of the input image, according to a degree of difficulty in coding the input image, and outputs an image to be coded; a moving image coding unit configured to code the image outputted by the image converting unit to generate the coded bit stream, and transmit the coded bit stream through the transmission channel; a bit rate determining unit configured to determine a coding bit rate that is a bit rate of the coded bit stream transmitted through the transmission channel; and a resolution range selecting unit configured to select a resolution range for determining an upper limit of a resolution of the image to be coded according to the coding bit rate determined by the bit rate determining unit, wherein when the resolution of the image to be coded is to be increased, the image converting unit is configured to determine a new resolution so that the resolution of the image to be coded does not exceed the upper limit determined by the resolution range selecting unit.

The recording medium according to an aspect of the present invention is a non-transitory computer-readable recording medium for use in a computer, the recording medium having a program causing a computer to code an input image to generate a coded bit stream, and transmit the coded bit stream through a transmission channel, and the program causes the computer to execute: changing at least one of a resolution and a frame rate of the input image, according to a degree of difficulty in coding the input image, and outputting an image to be coded; coding the image outputted in the changing to generate the coded bit stream, and transmitting the coded bit stream through the transmission channel; determining a coding bit rate that is a bit rate of the coded bit stream transmitted through the transmission channel; and selecting a resolution range for determining an upper limit of a resolution of the image to be coded according to the coding bit rate determined in the determining, wherein when the resolution of the image to be coded is to be increased, a new resolution is determined in the changing so that the resolution of the image to be coded does not exceed the upper limit determined in the selecting.

The integrated circuit according to an aspect of the present invention is an integrated circuit that codes an input image to generate a coded bit stream, and transmits the coded bit stream through a transmission channel, and the circuit includes: an image converting unit configured to change at least one of a resolution and a frame rate of the input image, according to a degree of difficulty in coding the input image, and outputs an image to be coded; a moving image coding unit configured to code the image outputted by the image converting unit to generate the coded bit stream, and transmit the coded bit stream through the transmission channel; a bit rate determining unit configured to determine a coding bit rate that is a bit rate of the coded bit stream transmitted through the transmission channel; and a resolution range selecting unit configured to select a resolution range for determining an upper limit of a resolution of the image to be coded according to the coding bit rate determined by the bit rate determining unit, wherein when the resolution of the image to be coded is to be increased, the image converting unit is configured to determine a new resolution so that the resolution of the image to be coded does not exceed the upper limit determined by the resolution range selecting unit.

The present invention can be implemented not only as a moving image coding method or a moving image coding apparatus but also as an integrated circuit for implementing functions of the moving image coding method or the moving image coding apparatus and as a program causing a computer to execute the functions. It is obvious that such a program can be distributed using recording media, such as a CD-ROM and via transmission media, such as the Internet.

Advantageous Effects of Invention

According to the moving image coding method and the moving image coding apparatus in the present invention, even when the degree of difficulty in compressing an input moving image or the target coding bit rate is considerably changed, an image that can be easily compressed at a low bit rate can be prevented from being coded with a larger resolution. As a result, a moving image can be coded without causing any uncomfortable feeling, such as blurs resulting from frequent change in the resolution at a low bit rate. Moreover, the subjective degradation in the image quality can be prevented.

BRIEF DESCRIPTION OF DRAWINGS

FIG. 1C is a flowchart indicating operations performed by the moving image coding apparatus in FIG. 1B.

FIG. 3 illustrates relationships between an image (a) before changing the resolution and each of images (b) to (d) after changing the resolution.

FIG. 9 illustrates a table indicating relationships between bit rates and resolution ranges that are held by the resolution range selecting circuit in FIG. 1A.

FIG. 13 illustrates a diagram indicating the resolution, frame rate, transition conditions, and state transition destinations for each state in FIG. 12.

DESCRIPTION OF EMBODIMENTS

Next, specific details of the present invention will be described using Embodiments 1 to 4.

Embodiment 1

Figure 1A:
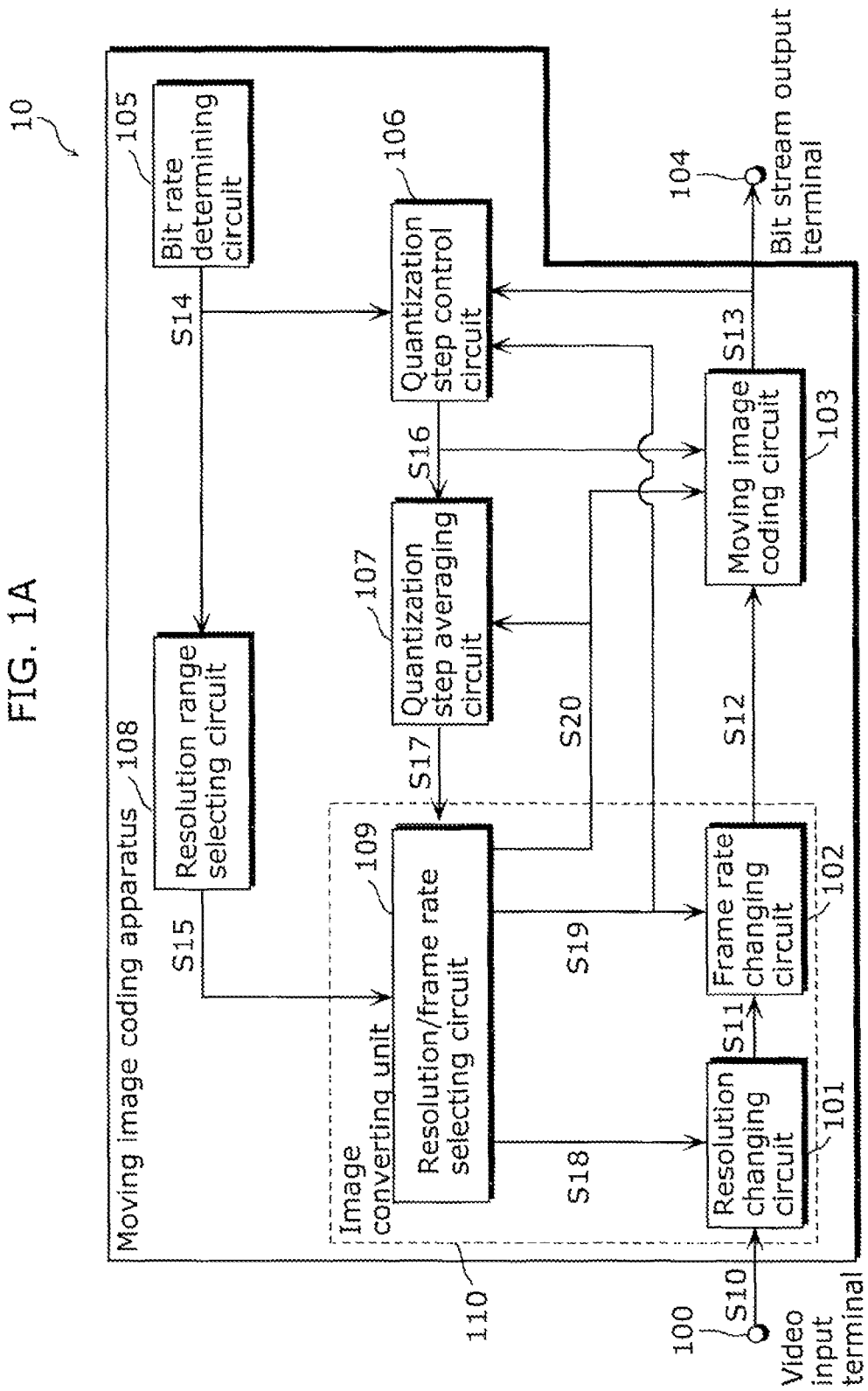
FIG. 1A is a block diagram of a moving image coding apparatus according to Embodiment 1 in the present invention.

FIG. 1A is a block diagram of a moving image coding apparatus 10 according to Embodiment 1 in the present invention.

The moving image coding apparatus 10 includes a resolution changing circuit (resolution changing unit) 101, a frame rate changing circuit (frame rate changing unit) 102, a moving image coding circuit (moving image coding unit) 103, a bit rate determining circuit (bit rate determining unit) 105, a quantization step control circuit (quantization step calculating unit) 106, a quantization step averaging circuit (average value calculating unit) 107, a resolution range selecting circuit (resolution range selecting unit) 108, and a resolution/frame rate selecting circuit (image quality determining unit) 109. The moving image coding apparatus 10 obtains a video signal S10 from a video input terminal 100, and transmits a generated bit stream S13 from a bit stream output terminal 104 through a transmission channel.

The resolution changing circuit 101 changes the resolution of the video signal S10 obtained from the video input terminal 100, to the resolution indicated by a resolution selection signal S18. The frame rate changing circuit 102 changes the frame rate of the video signal S11 in which the resolution has been changed into the frame rate indicated by a frame rate selection signal S19.

The resolution changing circuit 101, the frame rate changing circuit 102, and the resolution/frame rate selecting circuit 109 to be described later compose an image converting unit 110 that converts an input image (corresponding to the video signal S10) into an image to be coded (corresponding to a video signal S12). The image converting unit 110 changes at least one of the resolution and the frame rate of the input image according to the degree of difficulty in coding an input image, and outputs the image to be coded.

The moving image coding circuit 103 obtains a quantization step indicated by a quantization step signal S16 and a resolution change indication signal S20 indicating the presence or absence of change in the resolution, and generates the bit stream S13 by coding the video signal S12 in which the frame rate has been changed. The video signal S11 or S12 is assumed to include information of the resolution and the frame rate of an image that are necessary for coding in the moving image coding circuit 103. The moving image coding apparatus 103 transmits the generated bit stream S13 to a transmission channel through the bit stream output terminal 104. The quantization step control circuit 106 obtains a coding bit rate signal S14, the frame rate selection signal S19, and the bit stream S13, and determines a quantization step. The number of bits of the bit stream S13 may be input to the quantization step control circuit 106, instead of the bit stream S13.

The quantization step averaging circuit 107 obtains the quantization step signal S16 and the resolution change indication signal S20, and calculates a quantization step average value that is an average value of quantization steps that are at the same resolution and calculated during a predetermined time period. Although the method of calculating the quantization step average value is not particularly limited, the quantization step average value may be calculated, for example, using an exponentially weighted moving average.

The bit rate determining circuit 105 determines a coding bit rate of the bit stream S13 to be output from the moving image coding circuit 103. Although the method of determining the coding bit rate is not particularly limited, the coding bit rate may be determined based on the coding bit rate that can be transmitted through a transmission channel. Alternatively, the coding bit rate may be specified by the user.

The resolution range selecting circuit 108 obtains the coding bit rate signal S14, and determines a resolution selection range set by an upper limit and a lower limit of the resolution of an image to be coded, from the coding bit rate. The resolution/frame rate selecting circuit 109 obtains a quantization step average value signal S17 and a resolution selection range signal S15, and determines the resolution and the frame rate of the image to be coded. Then, the resolution/frame rate selecting circuit 109 outputs the resolution selection signal S18, the frame rate selection signal S19, and the resolution change indication signal S20.

Figure 1B:
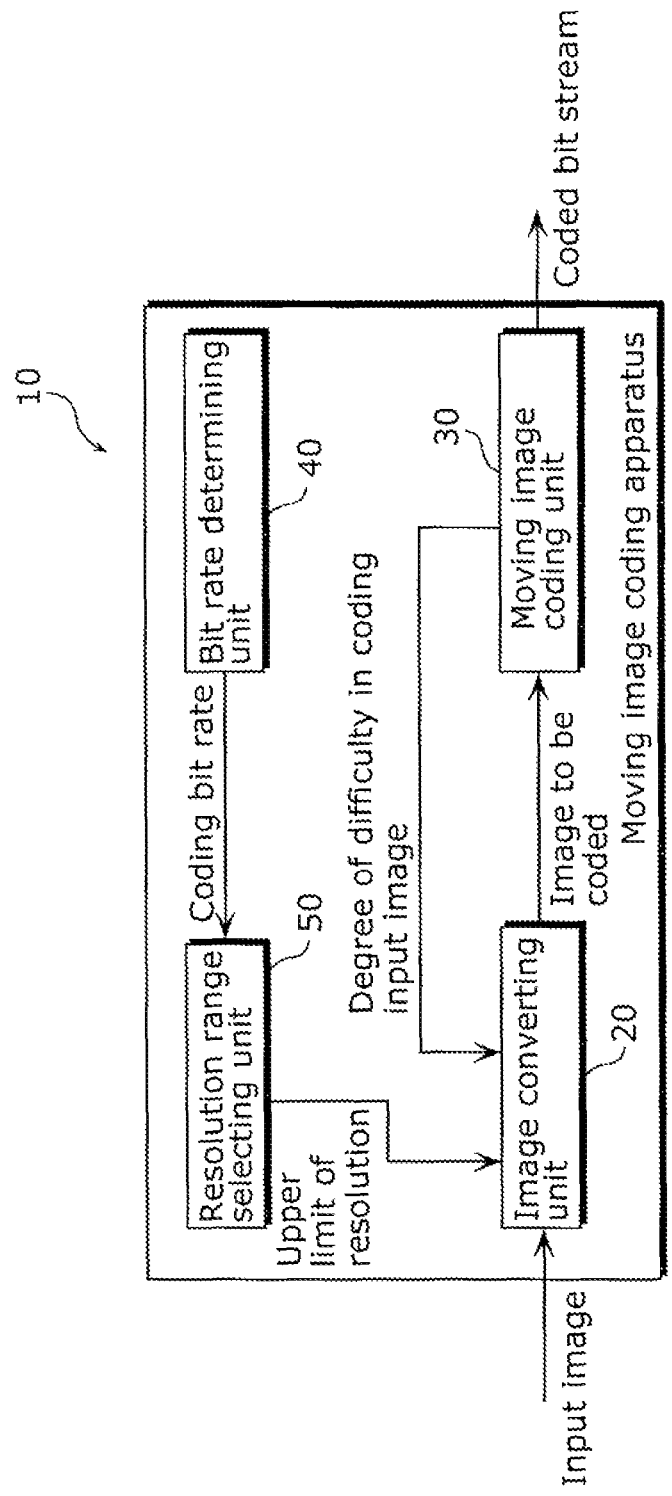
FIG. 1B is a block diagram of the minimum configuration of the moving image coding apparatus according to Embodiment 1.

Next, the minimum configuration of the image coding apparatus 10 according to Embodiment 1 will be described with reference to FIGS. 1B and 1C. First, as illustrated in FIG. 1B, the image coding apparatus 10 includes an image converting unit 20, a moving image coding unit 30, a bit rate determining unit 40, and a resolution range selecting unit 50. The moving image coding apparatus 10 codes an input image to generate a coded bit stream, and transmits the coded bit stream through a transmission channel. Here, the image converting unit 20 corresponds to the image converting unit 110 in FIG. 1A, the moving image coding unit 30 corresponds to the moving image coding circuit 103, the quantization step control circuit 106, and the quantization step averaging circuit 107 in FIG. 1A, the bit rate determining unit 40 corresponds to the bit rate determining circuit 105 in FIG. 1A, and the resolution range selecting unit 50 corresponds to the resolution range selecting circuit 108 in FIG. 1A.

The image converting unit 110 obtains an input image, generates an image to be coded by changing at least one of the resolution and the frame rate of the obtained input image, and outputs the generated image to be coded to the moving image coding circuit 103 (Step 11). The resolution and the frame rate of the image to be coded are determined, based on the degree of difficulty in coding the input image obtained from the quantization step averaging circuit 107, and on the upper limit of the resolution obtained from the resolution range selecting circuit 108.

The moving image coding circuit 103 obtains the image to be coded from the image converting unit 110, codes the obtained image to generate a coded bit stream, and transmits the generated coded bit stream through the transmission channel (Step 12). Furthermore, the moving image coding circuit 103, the quantization step control circuit 106, and the quantization step averaging circuit 107 estimate the degree of difficult in coding the next input image based on a result of coding processes on the images coded until the current point in time, and notifies the image converting unit 110 of the estimated degree of difficulty.

The bit rate determining circuit 105 determines the coding bit rate that is a bit rate of the coded bit stream to be transmitted through the transmission channel, and notifies the resolution range selecting circuit 108 of the determined coding bit rate (Step 13).

The resolution range selecting circuit 108 determines the upper limit of the resolution of the image to be coded according to the coding bit rate determined in the determining of a coding bit rate, and controls the process performed by the image converting unit 110 by notifying the determined upper limit of the resolution so that the resolution of the image to be coded does not exceed the upper limit (Step 14).

Figure 2:
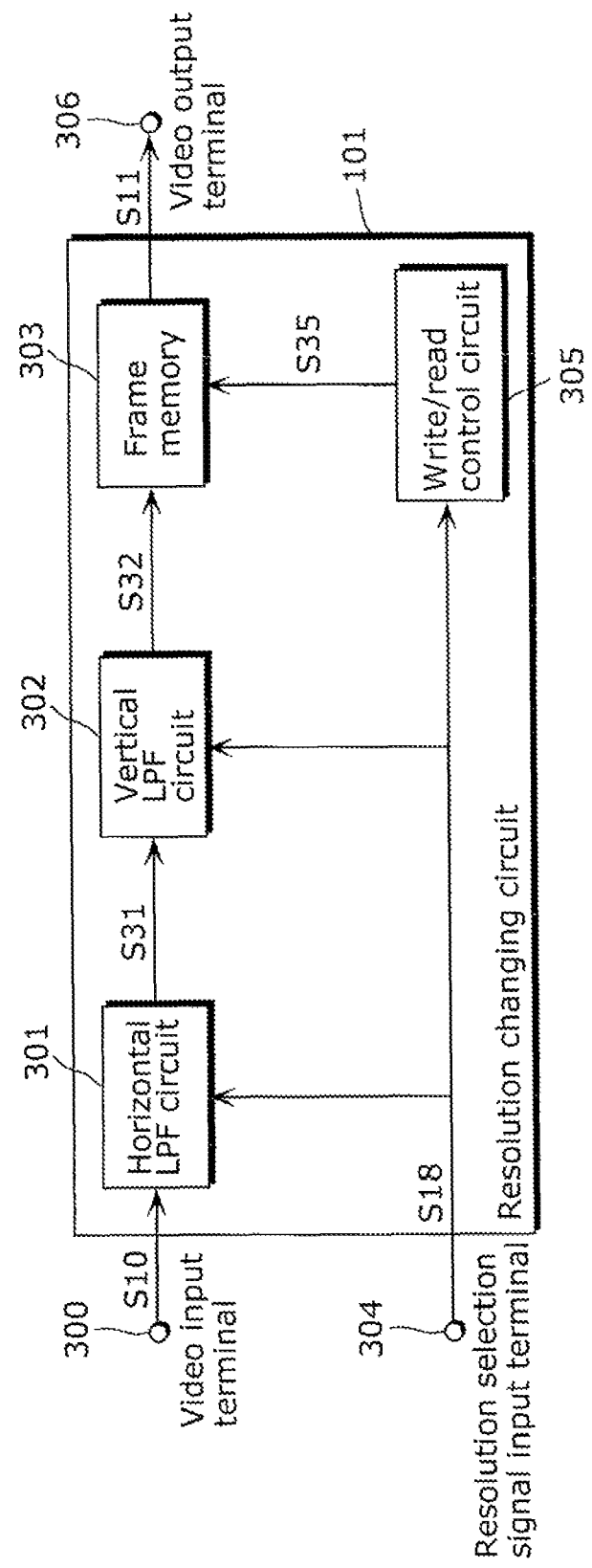
FIG. 2 illustrates a detailed block diagram of the resolution changing circuit in FIG. 1A.

FIG. 2 illustrates a block configuration of the resolution changing circuit 101 in FIG. 1A. Furthermore, FIG. 3 including images (a) to (d) is a diagram indicating write addresses and read addresses corresponding to pixel positions of a frame memory.

As illustrated in FIG. 2, the resolution changing circuit 101 includes a horizontal LPF circuit 301, a vertical LPF circuit 302, a frame memory 303, and a write/read control circuit 305. The resolution changing circuit 101 obtains the video signal S10 from a video input terminal 300, and the resolution selection signal S18 from a resolution selection signal input terminal 304, and outputs a video signal S11 obtained by changing the resolution of the video signal S10 to a video output terminal 306.

The horizontal LPF circuit 301 horizontally low-path filters the video signal S10 to generate a video signal S31. The vertical LPF circuit 302 vertically low-path filters the video signal S31 to generate a video signal S32. The frame memory 303 stores one frame of the video signal S32. The write/read control circuit 305 controls reading and writing from and into the frame memory 303.

Each of the horizontal LPF circuit 301 and the vertical LPF circuit 302 averages an input image, and switches between low-pass characteristics according to the resolution selection signal S18 fed from the resolution selection signal input terminal 304. More specifically, when the reduction ratio of the resolution is larger (when changing into an image having a lower resolution), a bandwidth of a passband of the low-path filter is narrowed so as to pass only the low-frequency component. When the reduction ratio of the resolution is smaller (when changing into an image having a medium resolution), the bandwidth of the passband of the low-path filter is widened so as to pass the low-medium frequency component. The low-path filtering is a process for suppressing folding noise occurring from down-sampling in the reduction process.

The horizontal and vertical low-path filtering is performed on the video signal S10 fed from the video input terminal 300, using an appropriate passband according to the resolution selection signal S18. Next, the write/read control circuit 305 successively writes the video signal S32 that has been low-pass filtered, in the write address positions of the frame memory 303.

Figure 3:
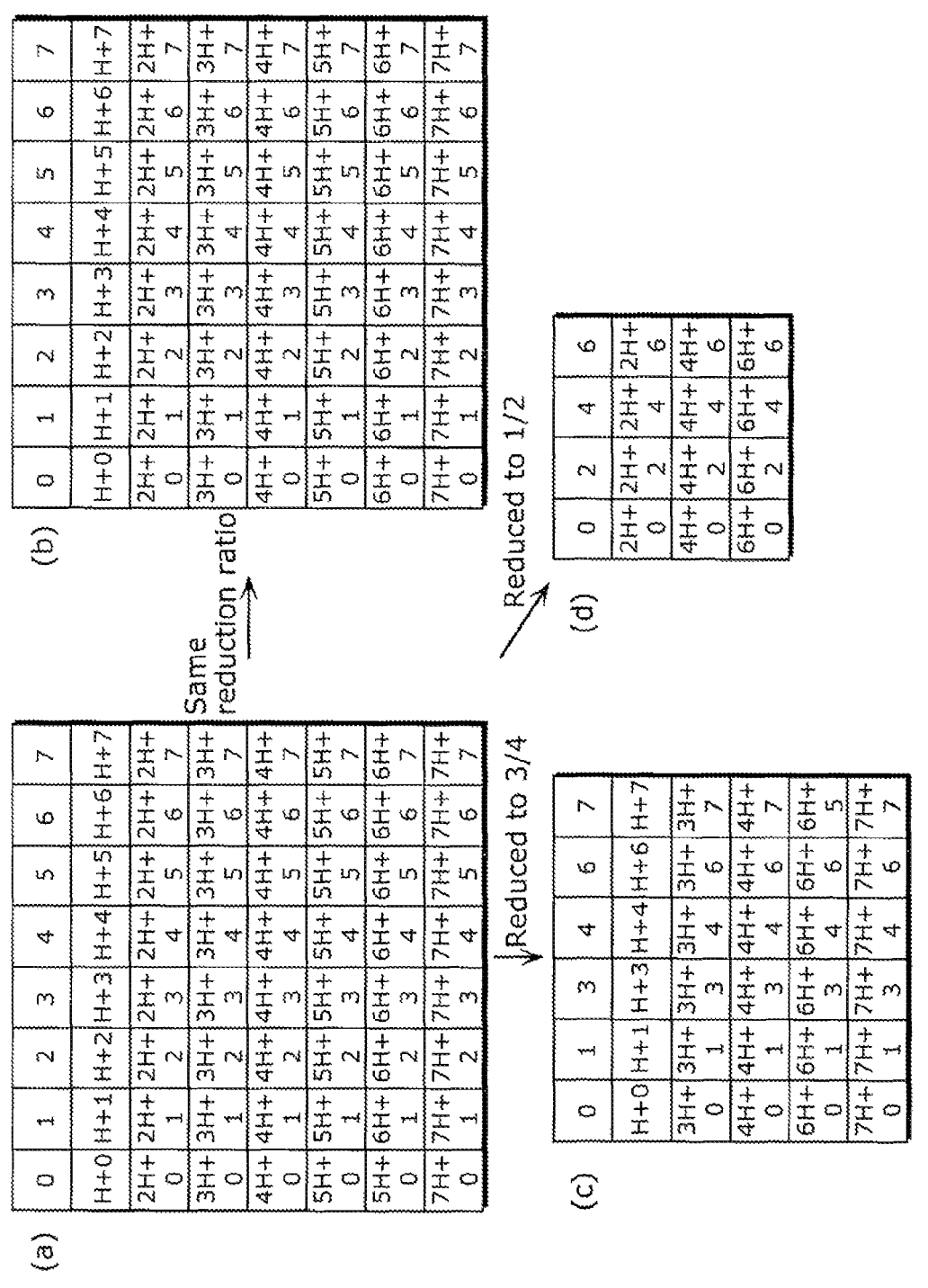

The image (a) in FIG. 3 is an example of the video signal S10. Pixels are arranged at two-dimensional addresses from left to right on the memory, and each of the addresses immediately lower than the current addresses is increased by "H". The write/read control circuit 305 controls the write and read addresses of an image of which size has been reduced, according to the reduction ratio indicated by the resolution selection signal S18 obtained from the resolution selection signal input terminal 304. The image (b) in FIG. 3 is a diagram indicating read addresses of the pixels of the video signal S10 in the case of an output of the image (a) in FIG. 3 by the same reduction ratio in the horizontal direction and in the vertical direction (hereinafter simply denoted as a reduction ratio). Similarly, the image (c) in FIG. 3 is a diagram indicating read addresses of the pixels of the video signal S10 in the case of an output of the image (a) in FIG. 3 by the reduction ratio of ¾, while the image (d) in FIG. 3 is a diagram indicating read addresses of the pixels of the video signal S10 in the case of an output of the image (a) in FIG. 3 by a reduction ratio of ½. As such, a reduced image is generated by extracting only pixels at positions where low-pass filtered and writing the pixels into the frame memory 303. Next, the write/read control circuit 305 successively reads the extracted addresses from the frame memory 303, and outputs the addresses as the video signals S11 to the video output terminal 306.

Figure 4:
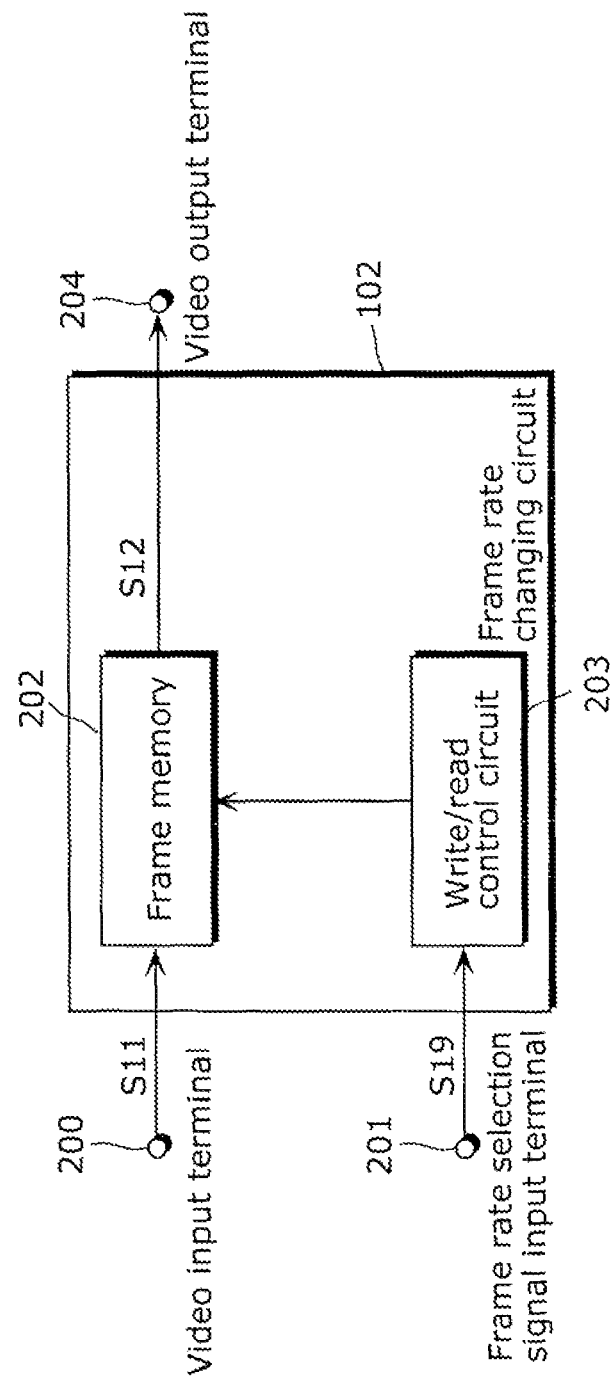
FIG. 4 illustrates a detailed block diagram of the frame rate changing circuit in FIG. 1A.
Figure 5:
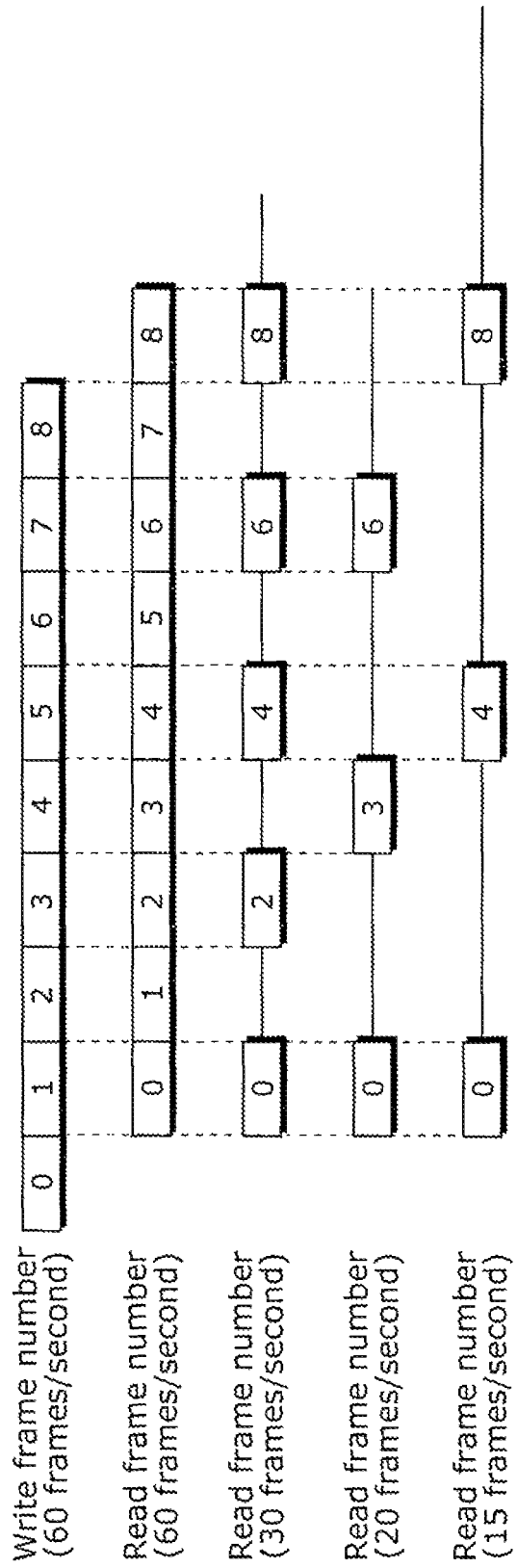
FIG. 5 illustrates a time chart of a process of changing the frame rate.

FIG. 4 illustrates a block configuration of the frame rate changing circuit 102 in FIG. 1A. FIG. 5 illustrates a time chart indicating operations performed by the frame rate changing circuit 102.

As illustrated in FIG. 4, the frame rate changing circuit 102 includes a video input terminal 200 to which the video signal S11 having the changed resolution is fed, a frame rate selection signal input terminal 201 to which the frame rate selection signal S19 is fed, a frame memory 202 that stores the obtained video signal S11, a write/read control circuit 203 that controls reading and writing from and into the frame memory 202, and a video output terminal 204 that outputs the video signal S12 having the changed frame rate.

The video signal S11 fed from the video input terminal 200 is written into the frame memory 202. More specifically, the write/read control circuit 203 controls the frame memory 202 in the writing according to the write frame numbers in the time chart (top row) in FIG. 5, and successively writes the video signals S11 in the frame memory 202.

Next, the write/read control circuit 203 intermittently reads frames from the frame memory 202 by skipping some of the frames according to the frame rate selection signal S19 obtained from the frame rate selection signal input terminal 201, as indicated by the read frame numbers in the time chart (second to fifth rows) in FIG. 5, and outputs the video signals S12 indicating the read frames. Thereby, the frame rate can be changed.

Figure 6:
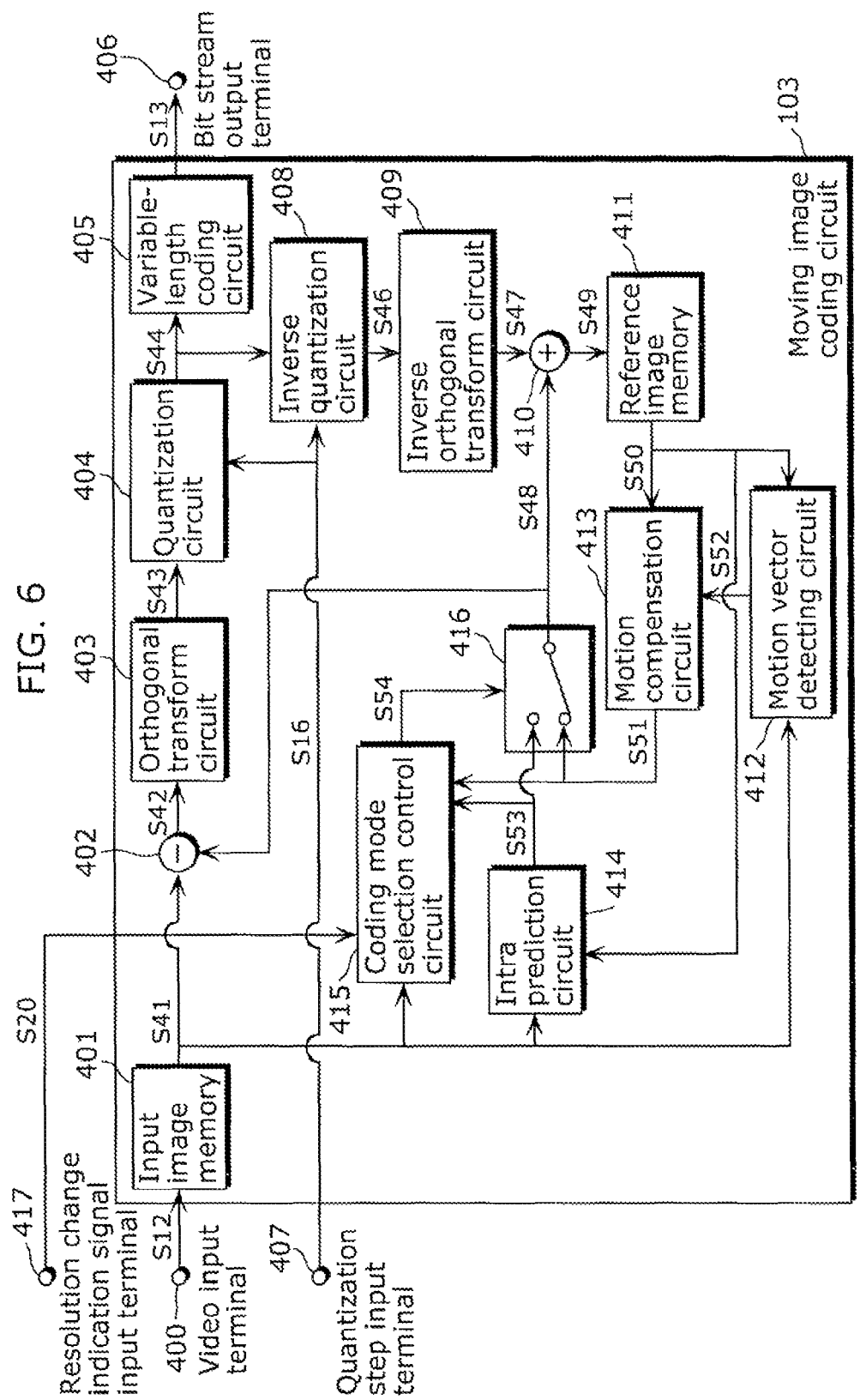
FIG. 6 illustrates a detailed block diagram of the moving image coding circuit in FIG. 1A.

FIG. 6 is a block configuration of the moving image coding circuit 103. As illustrated in FIG. 6, the moving image coding circuit 103 includes an input image memory 401, a difference arithmetic circuit 402, an orthogonal transform circuit 403, a quantization circuit 404, a variable-length coding circuit 405, an inverse quantization circuit 408, an inverse orthogonal transform circuit 409, an addition arithmetic circuit 410, a reference image memory 411, a motion vector detecting circuit 412, a motion compensation circuit 413, an intra prediction circuit 414, a coding mode selection control circuit 415, and a predictive image selector circuit 416. The moving image coding circuit 103 obtains the video signal S12 from a video input terminal 400, the quantization step signal S16 from a quantization step input terminal 407, and a resolution change indication signal S20 from a resolution change indication signal input terminal 417, and outputs the bit stream S13 to a bit stream output terminal 406.

The input image memory 401 converts the input video signal S12 into a video signal S41 on a per block basis by changing the pixel order. The difference arithmetic circuit 402 calculates a difference between the video signal S41 that is divided per block and a predictive image signal S48 to generate a difference signal S42.

The orthogonal transform circuit 403 orthogonally transforms the difference signal S42, and outputs a coefficient signal S43. The quantization circuit 404 quantizes the coefficient signal S43 using the quantization step signal S16 to generate a quantization value S44. The variable-length coding circuit 405 variable-length codes the quantization value S44.

The inverse quantization circuit 408 inversely quantizes the quantization value S44 using the quantization step signal S16 to generate an inversely-quantized coefficient signal S46. The inverse orthogonal transform circuit 409 inverse-orthogonally transforms the inversely-quantized coefficient signal S46 to generate an inverse-orthogonally transformed video signal S47. The addition arithmetic circuit 410 adds the inverse-orthogonally transformed video signal S47 and the predictive image signal S48 to generate reference image data S49. The reference image memory 411 temporarily stores the reference image data S49.

The motion vector detecting circuit 412 compares the reference image data S50 read from the reference image memory 411 with the video signal S41 that is divided per block, detects a motion vector of the video signal S41, and outputs a motion vector signal S52. The motion compensation circuit 413 reads the reference image data S50 from the reference image memory 411 in response to the motion vector signal S52, performs motion compensation using the read reference image data S50, and outputs resulting motion prediction image data S51.

The intra prediction circuit 414 performs intra prediction by comparing image data of the vicinity of a block to be coded with the video signal S41 that is divided per block to generate intra predictive image data S53. The image data is read from the reference image memory 411.

The coding mode selection control circuit 415 obtains the video signal S41 that is divided per block, the motion prediction image data S51, the intra predictive image data S53, and the resolution change indication signal S20, and outputs a mode selection signal S54 based on the obtained signals and data. When the resolution is not changed, the coding mode selection control circuit 415 determines whether intra prediction mode or inter prediction mode is an optimal prediction mode. Although the method of the determining is not particularly limited, for example, the coding mode selection control circuit 415 compares a sum of absolute differences between the video signal S41 that is divided per block and the motion prediction image data S51, with a sum of absolute differences between the video signal S41 and the intra predictive image data S53. When the former value is smaller, inter prediction mode may be selected, whereas when the latter value is smaller, intra prediction mode may be selected. On the other hand, when the frame is the first frame having the changed resolution, intra prediction mode needs to be selected for sure.

The predictive image selector circuit 416 selects one of the intra prediction image data S53 and the motion predictive image data S51, according to the mode selection signal S54, and outputs the predictive image signal S48.

When the resolution is not changed, the optimal prediction mode is selected for each block of the input moving image signal. On the other hand, when the frame is the first frame having the changed resolution, intra prediction mode is selected. Then, the moving image coding circuit 103 orthogonally transforms the difference signal S42 that is a difference between the video signal S41 that is divided per block and the predictive image signal S48, quantizes the obtained coefficient signal S43 using the quantization step signal S16 fed from the quantization step input terminal 407, variable-length codes the quantization value S44, and outputs a bit stream signal. The resulting code amount is reduced as the value of the quantization step signal S16 is larger, whereas the code amount is increased as the value of the quantization step signal S16 is smaller. In other words, the resulting code amount is controlled using the quantization step signal S16.

Figure 7:
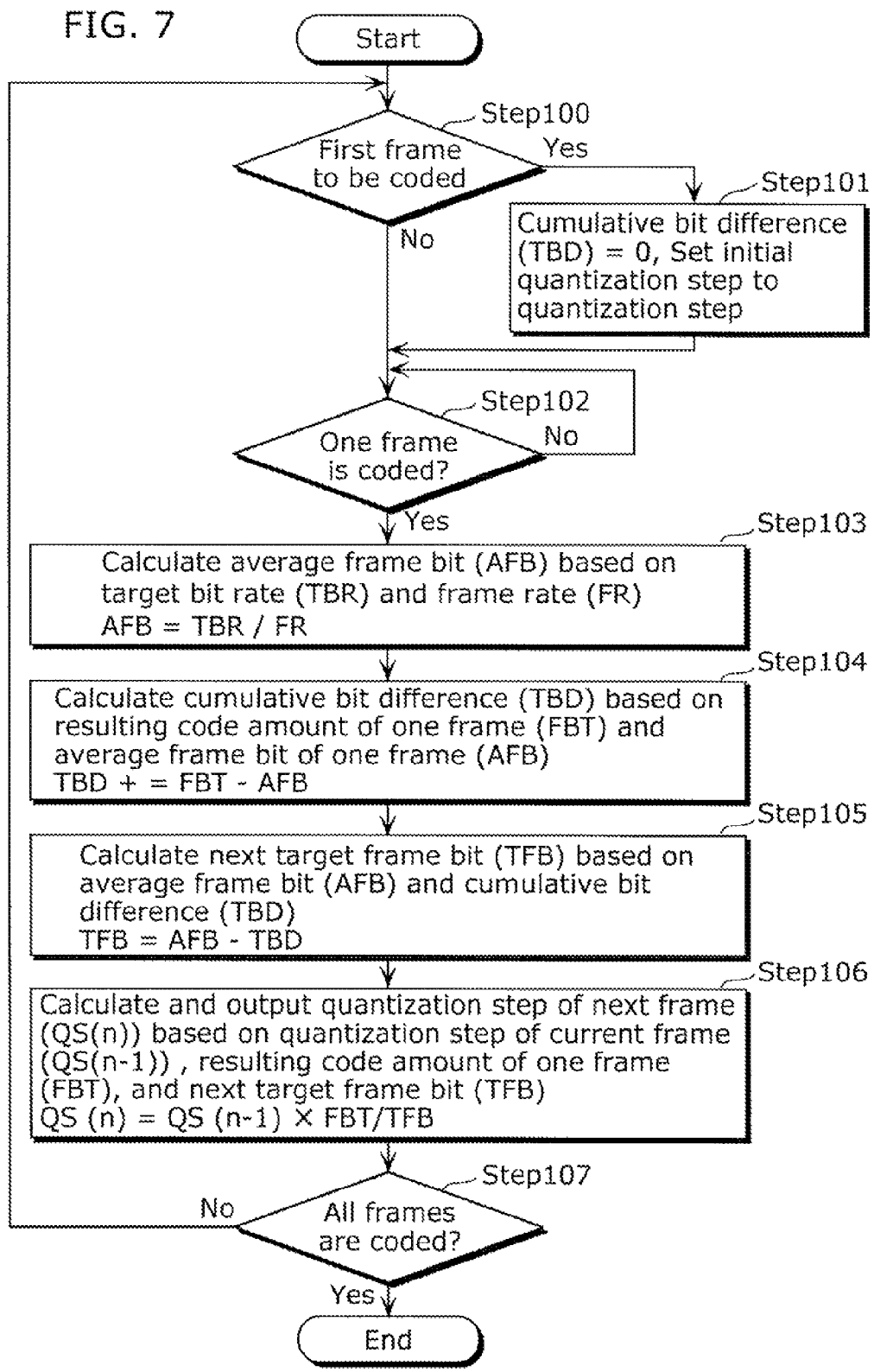
FIG. 7 illustrates a flowchart indicating operations performed by the quantization step control circuit in FIG. 1A.

FIG. 7 illustrates a flowchart indicating operations performed by the quantization step control circuit 106.

The quantization step control circuit 106 first determines whether or not an input frame is the first frame to be coded (Step 100). When determining that the input frame is not the first frame (No at Step 100), the quantization step control circuit 106 waits until the frame is coded using the quantization step determined at Steps 103 to 106 (Step 102). Since the moving image coding circuit 103 codes the frame, the quantization step control circuit 106 has only to wait until the frame is coded.

Furthermore, when the input frame is the first frame to be coded (Yes at Step 100), the quantization step control circuit 106 resets the cumulative bit difference (TBD) to 0, and sets the initial quantization step that is determined in advance to the quantization step of the current frame (Step 101). Then, the quantization step control circuit 106 waits until the frame is coded (Step 102).

Next, when the frame is coded, the quantization step control circuit 106 calculates an average frame bit (AFB) that is a target average code amount per frame, by substituting the obtained target bit rate (TBR) and a frame rate (FR) into Equation 1 (Step 103).

$$AFB=TBR/FR \qquad \text{(Equation 1)}$$

Next, the quantization step control circuit 106 counts a code amount of the bit stream S13. Then, the quantization step control circuit 106 calculates the cumulative bit difference (TBD) using Equation 2 based on the resulting code amount of one frame (FBT) and the average frame bit of one frame (AFB) (Step 104).

$$TBD\mathrel{+}=FBT-AFB \qquad \text{(Equation 2)}$$

Next, the quantization step control circuit 106 calculates the next target frame bit (TFB) using Equation 3, based on the average frame bit (AFB) and the cumulative bit difference (TBD) (Step 105).

$$TFB=AFB-TBD \qquad \text{(Equation 3)}$$

Next, the quantization step control circuit 106 calculates the quantization step of the next frame (QS(n)), based on the quantization step of the current frame (QS(n−1)), the code amount of one frame (FBT), and the next target frame bit (TFB) using Equation 4, and outputs the calculated quantization step (Step 106).

$$QS(n)=QS(n-1)\times FBT/TFB \qquad \text{(Equation 4)}$$

Then, the quantization step control circuit 106 determines whether or not all the frames are coded (Step 107). When a frame to be coded remains (No at Step 107), the aforementioned processes (Steps 100 to 106) are executed for the next frame. On the other hand, when all the frames are coded (Yes at Step 107), the processes end. In other words, the processes are repeatedly executed until all the frames are coded.

According to the processes, a value corresponding to a sum of the cumulative bit difference (TBD) and a difference between the resulting code amount at the end of coding of one frame (FBT) and the average frame bit (AFB) is a cumulative difference of the resulting codes at the end of coding of the current frame. The quantization step control circuit 106 calculates the next target frame bit (TFB) so that the cumulative bit difference (TBD) becomes 0 at the next frame.

Since the target frame bit (TFB) does not generally match the resulting code amount (FBT), another difference arises. However, with the repetition of the processes, the average of the code amounts matches the target average frame bit. In other words, coding an image using the calculated quantization step results in obtainment of the coded bit stream that can be transmitted at the target bit rate (TBR).

Figure 8:
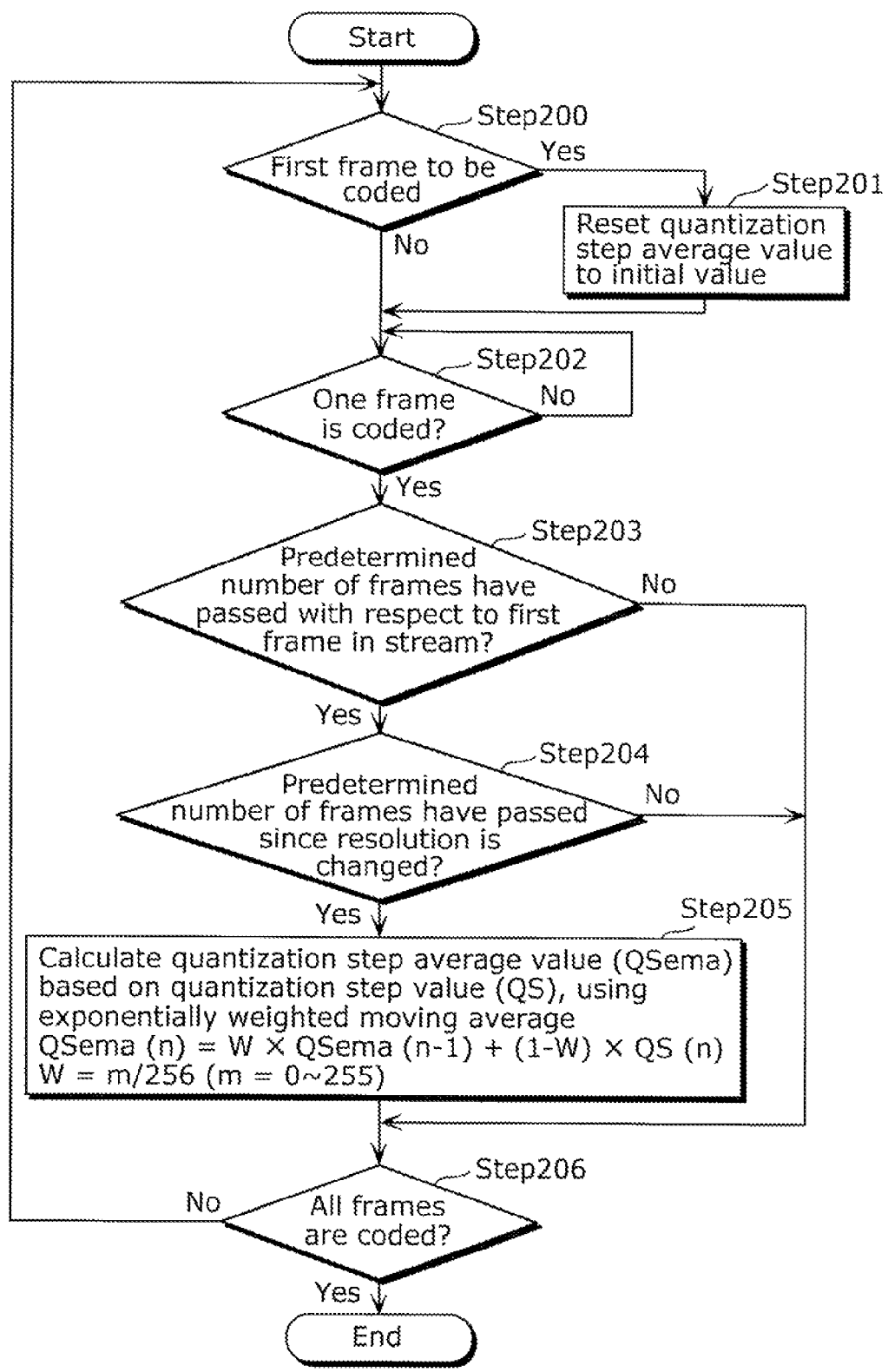
FIG. 8 illustrates a flowchart indicating operations performed by the quantization step averaging circuit in FIG. 1A.

FIG. 8 illustrates a flowchart indicating operations performed by the quantization step averaging circuit 107. FIG. 8 illustrates an example of calculating a quantization step average value using an exponentially weighted moving average.

The quantization step averaging circuit 107 first determines whether or not an input frame is the first frame to be coded (Step 200). When determining that the input frame is not the first frame (No at Step 200), the quantization step averaging circuit 107 waits until the frame is coded (Step 202). Since the moving image coding circuit 103 codes the frame, the quantization step averaging circuit 107 has only to wait until the frame is coded.

On the other hand, when the input frame is the first frame to be coded (Yes at Step 200), the quantization step averaging circuit 107 resets the quantization step average value to the initial value (Step 201), and waits until the frame is coded (Step 202).

Next, the quantization step averaging circuit 107 determines whether or not a predetermined number of frames have passed with respect to the first frame to be coded (Step 203), and then whether or not the predetermined number of frames have passed since the resolution is changed (Step 204). When both of the two conditions are satisfied (Yes at both of Steps 203 and 204), the quantization step averaging circuit 107 calculates the quantization step average value of the current frame (QSema(n)), based on a value of the quantization step of the current frame (QS(n)), the quantization step average value (QSema(n−1)) of previous frames, and a weighting coefficient W, using Equation 5 (Step 205).

$$QSema(n)=W\times QSema(n-1)+(1-W)\times QS(n) \qquad \text{(Equation 5)}$$

The weighting coefficient W in Equation 5 is a constant calculated using Equation 6. The weighting coefficient W is for controlling the degree of variations in the quantization step average value. As the weighting coefficient W is larger, the quantization step average value hardly varies, whereas as the weighting coefficient W is smaller, the quantization step average value easily varies. The weighting coefficient W may be a fixed value specified when designed and others, and a variable value according to a situation.

$$W=m/256(m=0\text{ to }255) \qquad \text{(Equation 6)}$$

Furthermore, when one of the two conditions is not satisfied (No at one of Steps 203 and 204), the quantization step averaging circuit 107 does not calculate the quantization step average value (QSema), and holds the previous quantization step average value (QSema).

Then, the quantization step averaging circuit 107 determines whether or not all the frames are coded (Step 206). When a frame to be coded remains (No at Step 206), the aforementioned processes (Steps 200 to 205) are executed for the next frame. On the other hand, when all the frames are coded (Yes at Step 206), the processes end. In other words, the processes (Steps 200 to 205) are repeatedly executed until all the frames are coded.

FIG. 9 illustrates a reference table for explaining operations performed by the resolution range selecting circuit 108. As illustrated in FIG. 9, the resolution range selecting circuit 108 holds bit rates each in association with a lower limit and an upper limit of the resolution of an image to be coded. In the example of FIG. 9, the lower limit and the upper limit of the resolution of the image to be coded are set for each of cases where a threshold is equal to or larger than Rth0 (representing "high bit rate"), where the threshold is equal to or larger than Rth1 and smaller than Rth0 (representing "medium bit rate"), and where the threshold is smaller than Rth1 (representing "low bit rate").

Then, the resolution range selecting circuit 108 compares the coding bit rate signal S14 obtained from the bit rate determining circuit 105 with each of the thresholds Rth0 and Rth1. The resolution range selecting circuit 108 outputs the resolution selection range signal S15 including an upper limit and a lower limit of the resolution of an image to be coded.

Figure 10:
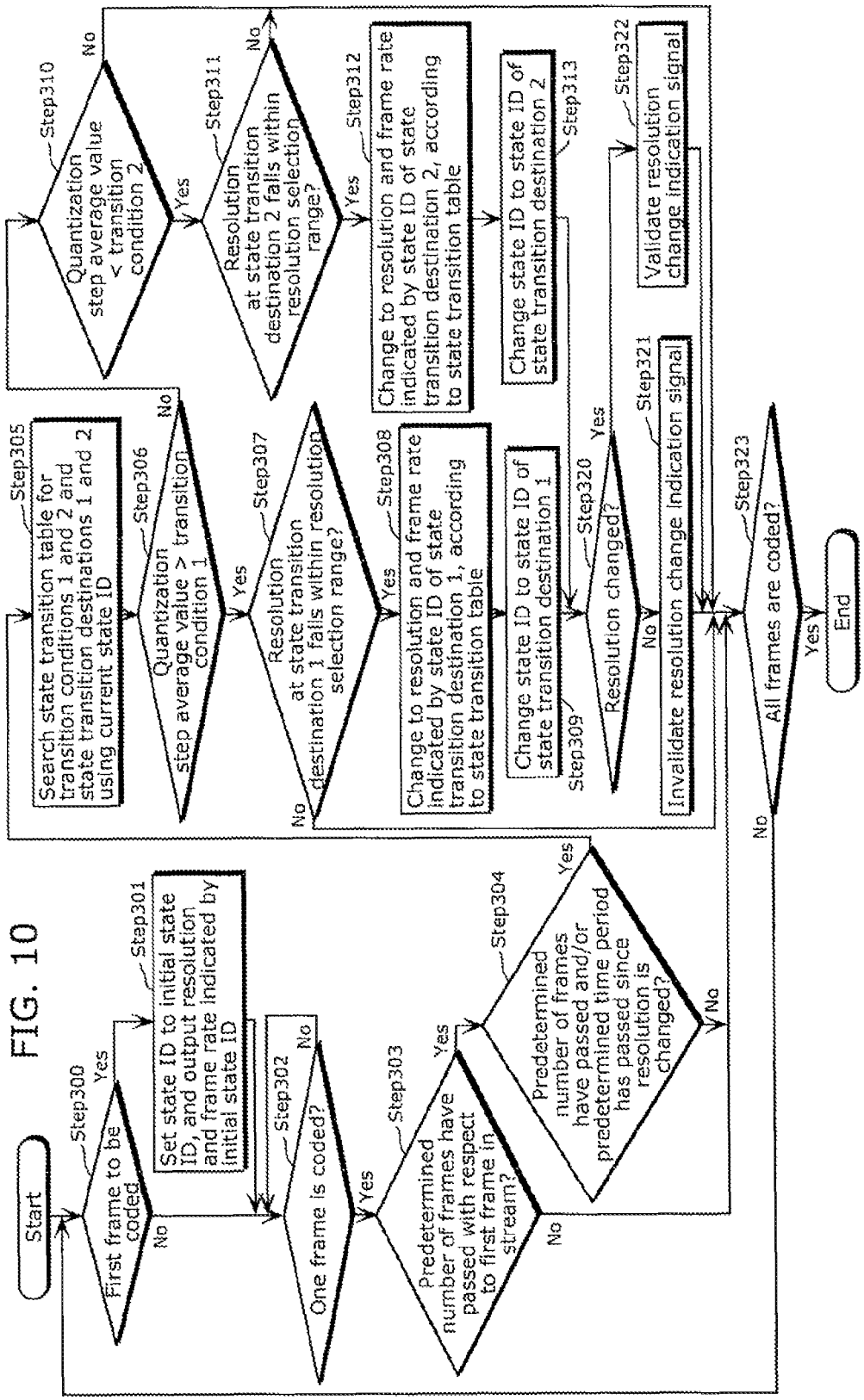
FIG. 10 illustrates a flowchart indicating operations performed by the resolution/frame rate selecting circuit in FIG. 1A.

FIG. 10 illustrates a flowchart indicating operations performed by the resolution/frame rate selecting circuit 109. The resolution/frame rate selecting circuit 109 determines the resolution and the frame rate of an image to be coded, based on the obtained quantization step average value signal S17 and the resolution selection range signal S15, in accordance with the procedure in FIG. 10.

The resolution/frame rate selecting circuit 109 first determines whether or not an input frame to be coded is the first frame (Step 300). When determining that the frame to be coded is not the first frame (No at Step 300), the resolution/frame rate selecting circuit 109 waits until the frame is coded using the resolution and frame rate that are currently set (Step 302). Since the moving image coding circuit 103 codes the frame, the resolution/frame rate selecting circuit 109 has only to wait until the frame is coded.

On the other hand, when the frame to be coded is the first frame (Yes at Step 300), the resolution/frame rate selecting circuit 109 sets a state ID to the initial state ID that is determined in advance. Furthermore, the resolution/frame rate selecting circuit 109 outputs the resolution selection signal S18 indicating a resolution indicated by the state ID, and outputs the frame rate selection signal S19 indicating a frame rate indicated by the state ID (Step 301). Then, the resolution/frame rate selecting circuit 109 waits until the frame is coded using the resolution and the frame rate (Step 302).

Next, when the frame is coded (Yes at Step 302), the resolution/frame rate selecting circuit 109 determines whether or not a predetermined number of frames have passed with respect to the first frame in a stream (Step 303) and then whether or not the predetermined number of frames have passed and/or a predetermined time period has passed since the resolution is changed (Step 304). Furthermore, when one of the two conditions is not satisfied (No at one of Steps 303 and 304), the resolution/frame rate selecting circuit 109 holds the current state ID, and the resolution and the frame rate that are indicated by the state ID without any change. When both of the two conditions are satisfied (Yes at both of Steps 303 and 304), the resolution/frame rate selecting circuit 109 determines the resolution and the frame rate to be used in coding the next frame.

The resolution/frame rate selecting circuit 109 determines the resolution and the frame rate of an image to be coded according to the degree of difficulty in coding an input image. The "degree of difficulty in coding" according to Embodiment 1 is determined based on the quantization step average value signal S17. In other words, as the quantization step average value signal S17 is larger, it is determined that coding the image will be more difficult, whereas as the quantization step average value signal S17 is smaller, it is determined that the image will be more easily coded. Furthermore, the resolution of the image to be coded is selected within a range set by the upper limit and the lower limit of the resolution that are indicated by the resolution selection range signal S15. More specifically, the resolution is determined in accordance with a state transition diagram as illustrated in FIG. 11.

Figure 11:
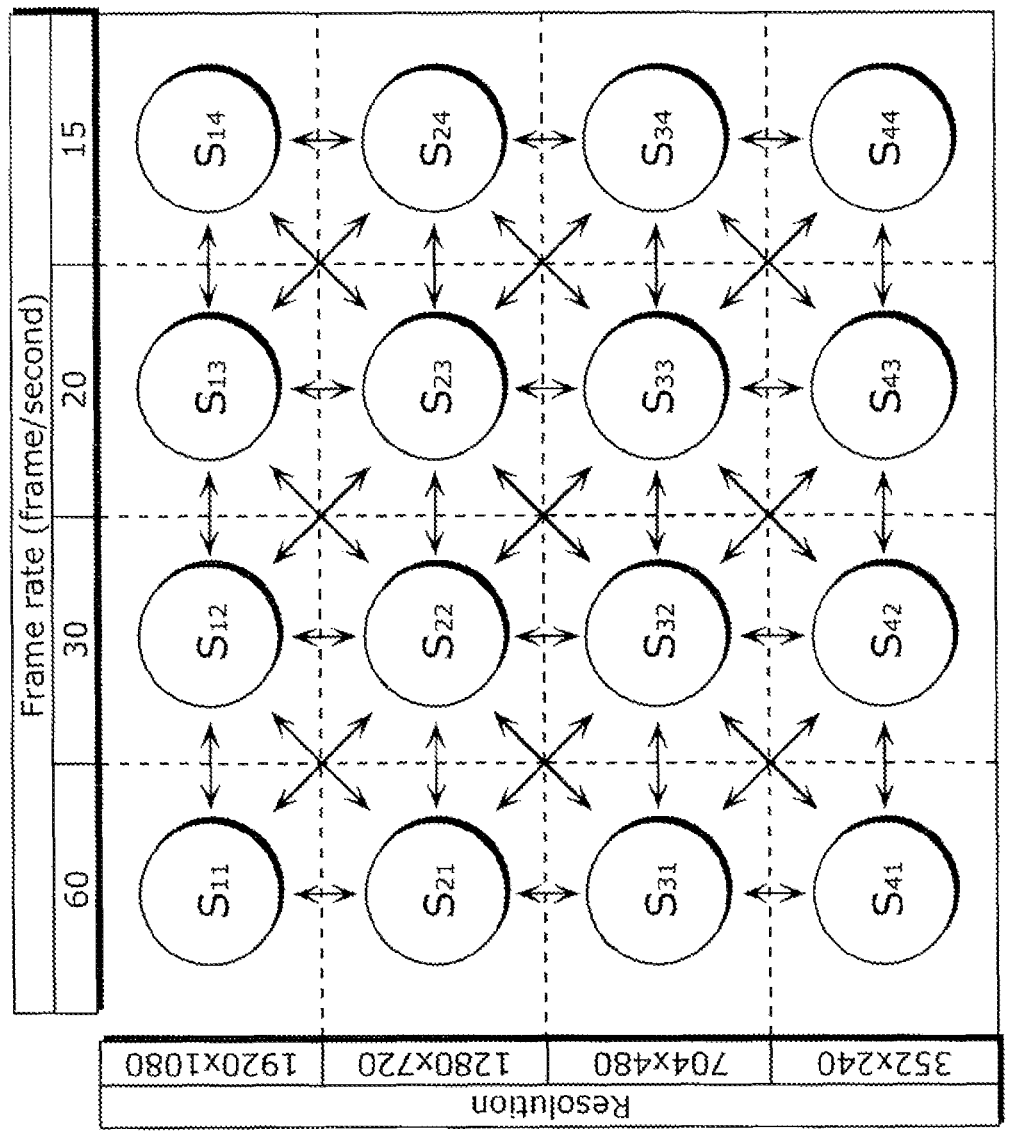
FIG. 11 illustrates an example of state transitions performed by the resolution/frame rate selecting circuit.

FIG. 11 illustrates the generalization of combinations of resolutions and frame rates. A state ID ($S_{11}$ to $S_{44}$) is assigned to each of the combinations of resolutions and frame rates. Each of the state IDs holds a transition condition for transitioning from the current state ID to another state ID. The current state ID and the other state ID may be not only vertically adjoined to each other (changes in the resolution) and horizontally adjoined to each other (changes in the frame rate), but also diagonally adjoined to each other (changes in the resolution and the frame rate). Furthermore, they are not necessarily adjoined to each other. In many cases, only the limited combinations among the combinations are used, and actually, the transition condition for transitioning to a non-transitioned state is always indicated as "false".

The specific example of the state transitions will be described with reference to FIGS. 10, 12, 13, and 14.

Figure 12:
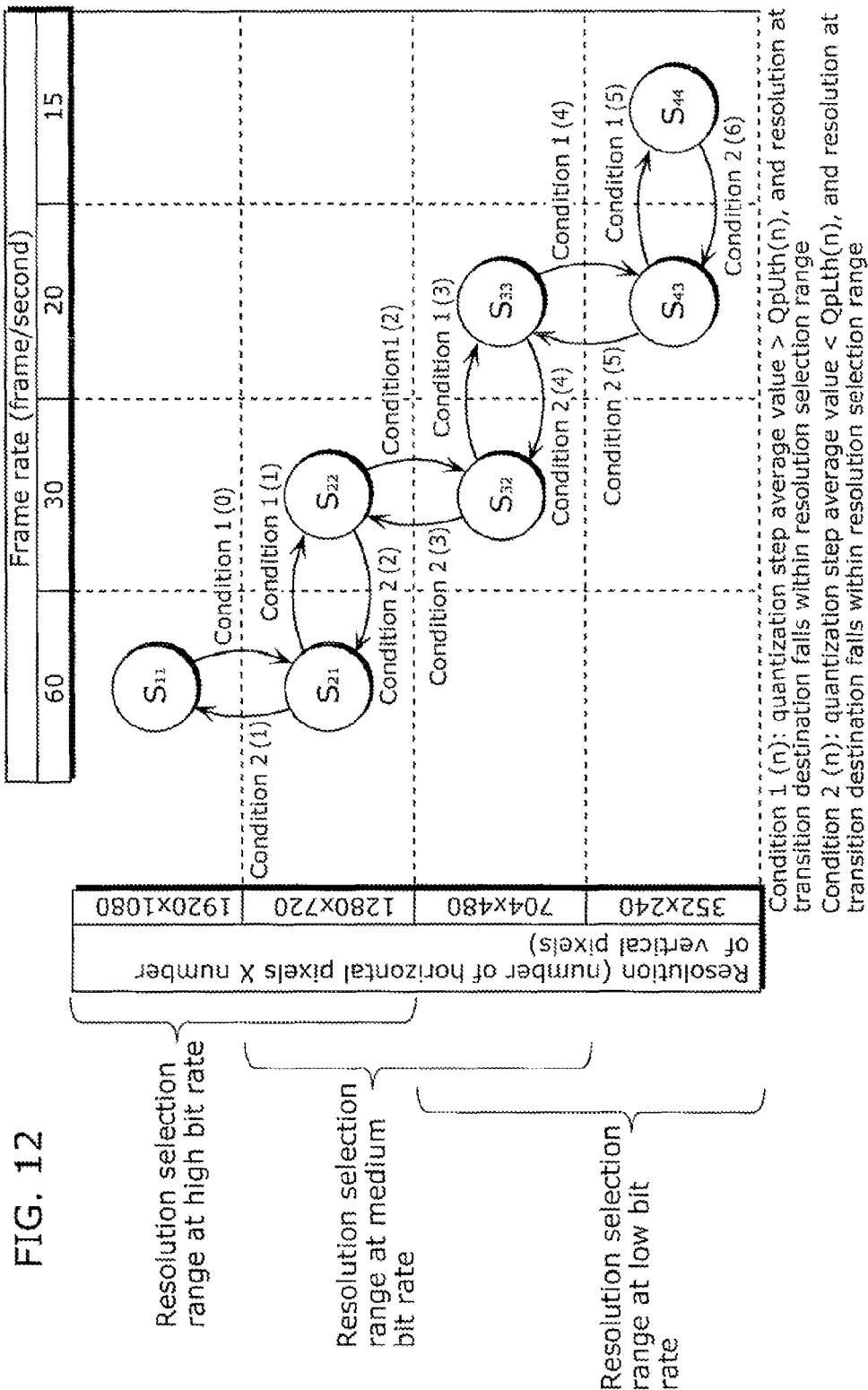
FIG. 12 illustrates a specific example of state transitions.

FIG. 12 illustrates an example of the state transitions. One of state IDs is always set to the resolution/frame rate selecting circuit 109. More specifically, the transition condition for transitioning from the current state ID to another state ID includes holding of a threshold of the quantization step average value signal S17.

FIG. 13 is a table indicating the resolution, frame rate, transition conditions 1 and 2, and state transition destinations 1 and 2 for each of the state IDs. Here, in the example of FIG. 13, the transition condition 1 indicates an upper limit (QpUth) of the quantization step average value signal S17, whereas the transition condition 2 indicates a lower limit (QpLth) of the quantization step average value signal S17. Furthermore, the transition condition 1 is a condition for reducing one of the resolution and the frame rate, whereas the transition condition 2 is a condition for increasing one of the resolution and the frame rate. In the examples of FIGS. 12 and 13, the current state ID transitions only to the other state ID that is vertically (resolution) and horizontally (frame rate) adjoined to the current state ID.

Figure 14:
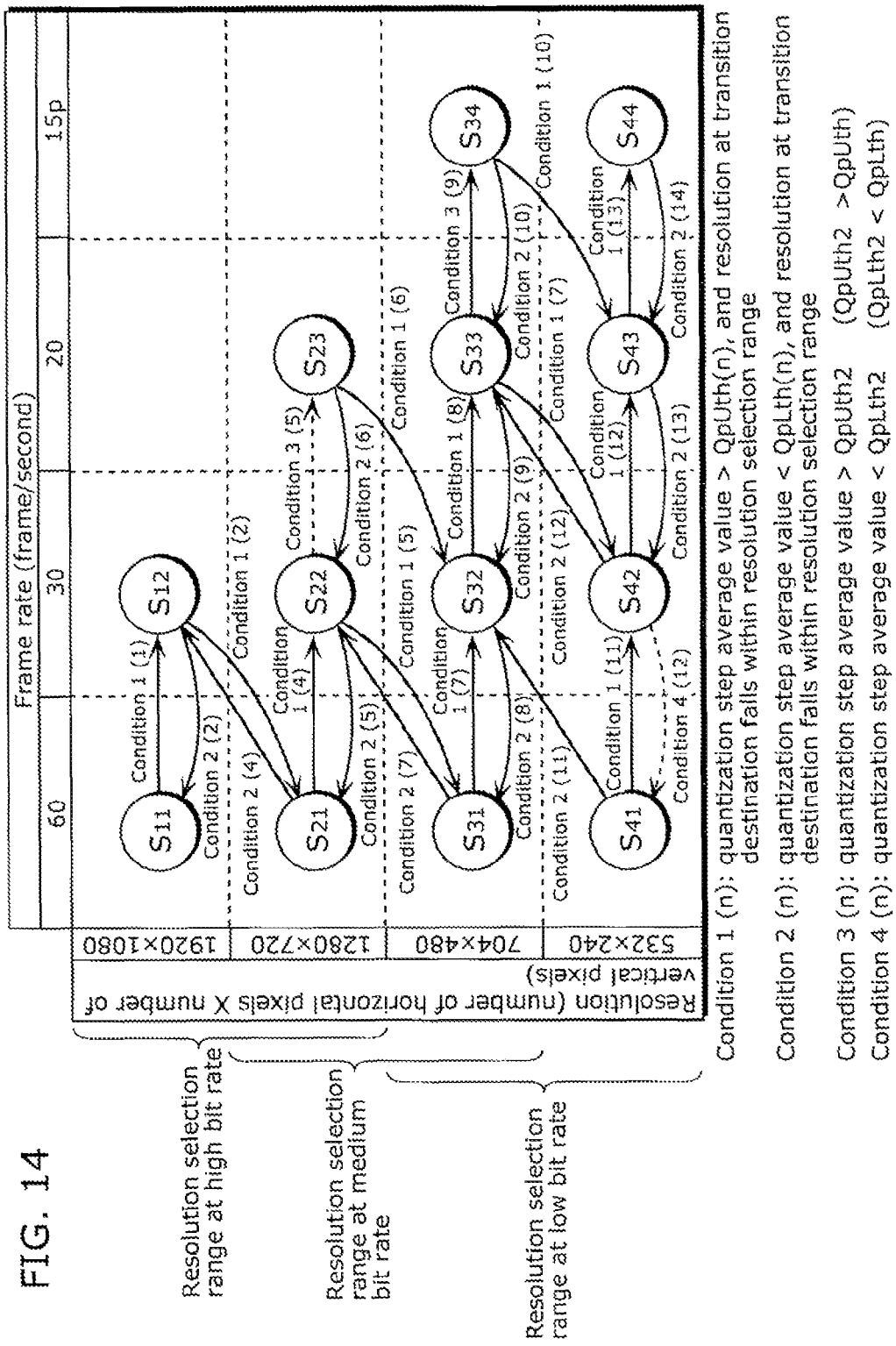
FIG. 14 illustrates another specific example of state transitions.

FIG. 14 illustrates another example of the state transitions. In the example of FIG. 14, the state transitions to another state when one of the transition conditions 1, 2, 3, and 4 is satisfied. Here, the transition conditions 1 and 2 are indicated in FIGS. 12 and 13. The transition condition 3 indicates the second upper limit (QpUth2) larger than the upper limit (QpUth) of the transition condition 1, whereas the transition condition 4 indicates the second lower limit (QpLth2) smaller than the lower limit (QpLth) of the transition condition 2. Furthermore, there are cases where transition conditions are different even with the same state transition between FIGS. 12 and 14.

First, the resolution/frame rate selecting circuit 109 reads the transition conditions 1 and 2, and the state transition destinations 1 and 2 all of which correspond to the current state ID (Step 305). Assuming that the current state ID is S11, the resolution/frame rate selecting circuit 109 reads the first row of FIG. 13.

Next, the resolution/frame rate selecting circuit 109 compares the quantization step average value signal S17 with the transition condition 1 (Step 306). Furthermore, the resolution/frame rate selecting circuit 109 determines whether or not the resolution of the state transition destination 1 falls within the resolution selection range (Step 307).

When the quantization step average value>the transition condition 1 (Yes at Step 306) and when the resolution of the state transition destination 1 falls within the resolution selection range (Yes at Step 307), the resolution/frame rate selecting circuit 109 searches the state transition table for a value of a resolution indicated by a state ID of the state transition destination 1 and outputs the resolution selection signal S18 indicating the value, and searches the same for a value of a frame rate indicated by the state ID and outputs the frame rate selection signal S19 indicating the value (Step 308). Furthermore, the resolution/frame rate selecting circuit 109 changes the state ID to that of the state transition destination 1 (Step 309). Furthermore, when the resolution is changed according to the change in the state ID (Yes at Step 320), the resolution change indication signal S20 is validated (Step 322). When the resolution is not changed (No at Step 320), the resolution change indication signal S20 is invalidated (Step 321).

Here, the specific example of the processes of Steps 306 to 307 in FIG. 10 will be described with reference to FIGS. 12 and 13. It is assumed that the resolution selection range signal S15 indicates a resolution selection range in the case of a high bit rate.

For example, when the current state ID is $S_{11}$ and the transition condition 1 is satisfied, the state transition destination 1 is $S_{21}$. Here, the resolution of the $S_{21}$ is 1280×720, and falls within the resolution selection range in the case of a high bit rate (FIG. 9). In other words, the state can transition from $S_{11}$ to $S_{21}$.

On the other hand, when the current state ID is $S_{21}$ and the transition condition 1 is satisfied, the state transition destination 1 is $S_{22}$. This is because the resolution of $S_{21}$ matches the lower limit of the resolution at the high bit rate, and thus there is no room for reducing the resolution. Accordingly, the state transitions from $S_{21}$ to $S_{22}$ where the resolution is not changed.

Although a state transition destination is predetermined when the transition condition 1 is satisfied, other methods may be used without being limited to this method. For example, when a resolution does not fall below the lower limit of the resolution selection range even if the state is to transition in a direction for decreasing the resolution (downward direction in FIG. 12), the state transitions in the direction. On the other hand, when the resolution falls below the lower limit, the state may transition in a direction for decreasing the frame rate (right direction in FIG. 12).

Furthermore, another specific example of the processes of Steps 306 to 307 in FIG. 10 will be described with reference to FIG. 14. It is assumed that the resolution selection range signal S15 to be described hereinafter indicates a resolution selection range in the case of a high bit rate.

For example, when the current state ID is $S_{12}$ and the transition condition 1 is satisfied, the state transition destination 1 is $S_{21}$. In other words, the example in FIG. 14 differs from that of FIG. 12 in that the frame rate is increased according to the reduction in the resolution. This is because the compression becomes easier by reducing the resolution, and thus the image quality is not degraded compared to the immediately previous state where the resolution is higher even with the slight increase in the frame rate.

Furthermore, when the current state ID is $S_{21}$ and the transition condition 1 is satisfied, the state transition destination 1 is $S_{22}$, which shows the same state as in the example in FIG. 12. However, in order to further reduce the frame rate (namely, transition from $S_{22}$ to $S_{23}$), the quantization step average value needs to satisfy the transition condition 3 that is tighter than the transition condition 1. Thus, the example in FIG. 14 differs from that of FIG. 12. Since degradation in the image quality is not noticeable by reducing the resolution compared to reduction in the frame rate, the state easily transitions to $S_{31}$ indicating the lower resolution.

In other words, in the case of a medium bit rate, the quantization step average value first satisfies the transition condition 1 that is looser than the transition condition 3, and thus the state transitions to $S_{31}$ indicating the lower resolution. On the other hand, the transition condition 1 is not satisfied because the resolution of $S_{31}$ is out of the selection range at the high bit rate. Thus, the state transitions to $S_{33}$ indicating the lower frame rate according to the transition condition 3.

Furthermore, when the quantization step average value the transition condition 1 (No at Step 306), the resolution/frame rate selecting circuit 109 compares the quantization step average value signal S17 with the transition condition 2 (Step 310). Furthermore, the resolution/frame rate selecting circuit 109 determines whether or not the resolution of the state transition destination 2 falls within the resolution selection range (Step 311).

When the quantization step average value<the transition condition 2 (Yes at Step 310) and when the resolution of the state transition destination 2 falls within the resolution selection range (Yes at Step 311), the resolution/frame rate selecting circuit 109 searches the state transition table for a value of a resolution indicated by a state ID of the state transition destination 2 and outputs the resolution selection signal S18 indicating the value, and searches the same for a value of a frame rate indicated by the state ID and outputs the frame rate selection signal S19 indicating the value (Step 312). Furthermore, the resolution/frame rate selecting circuit 109 changes the state ID to that of the state transition destination 2 (Step 313). Furthermore, when the resolution is changed according to the change in the state ID (Yes at Step 320), the resolution change indication signal S20 is validated (Step 322). When the resolution is not changed (No at Step 320), the resolution change indication signal S20 is invalidated (Step 321).

Next, the specific example of the processes of Steps 310 to 311 in FIG. 10 will be described with reference to FIGS. 12 and 13. It is assumed that the resolution selection range signal S15 to be described hereinafter indicates a resolution selection range in the case of a medium bit rate.

For example, when the current state ID is $S_{32}$ and the transition condition 2 is satisfied, the state transition destination 2 is $S_{22}$. Here, the resolution of $S_{22}$ is 1280×720, and falls within the resolution selection range in the case of a medium bit rate (FIG. 9). In other words, the state can transition from $S_{32}$ to $S_{22}$.

On the other hand, when the current state ID is $S_{22}$ and the transition condition 2 is satisfied, the state transition destination 2 is $S_{21}$. This is because the resolution of $S_{22}$ matches the upper limit of the resolution at the medium bit rate, and thus there is no room for increasing the resolution. Accordingly, the state transitions from $S_{22}$ to $S_{21}$ where the resolution is not changed.

Although a state transition destination is predetermined when the transition condition 2 is satisfied, other methods may be used without being limited to this method. For example, when a resolution does not exceed the upper limit of the resolution selection range even if the state is to transition in a direction for increasing the resolution (upward direction in FIG. 12), the state transitions in the direction. On the other hand, when the resolution exceeds the upper limit, the state may transition in a direction for increasing the frame rate (left direction in FIG. 12).

Furthermore, another specific example of the processes of Steps 310 to 311 in FIG. 10 will be described with reference to FIG. 14. It is assumed that the resolution selection range signal S15 to be described hereinafter indicates a resolution selection range in the case of a medium bit rate.

For example, when the current state ID is $S_{31}$ and the transition condition 2 is satisfied, the state transition destination 2 is $S_{22}$. In other words, the example in FIG. 14 differs from that of FIG. 12 in that the frame rate is decreased according to the increase in the resolution. Since the compression rapidly becomes difficult with increase in the resolution, reducing the frame rate slightly facilitates the compression, which reduces the possibility of rapidly degrading the image quality.

Furthermore, when the current state ID is $S_{22}$ and the transition condition 2 is satisfied, the state transition destination 1 is $S_{21}$, which shows the same state as in the example in FIG. 12. However, when the frame rate is considerably increased according to the relationship with the resolution (for example, transition from $S_{42}$ to $S_{41}$), the quantization step average value needs to satisfy the transition condition 4 that is tighter than the transition condition 2. Since increasing the resolution produces a clearer advantage than increasing the frame rate, it becomes easier to transition to $S_{33}$ indicating a higher resolution.

In other words, in the case of a low bit rate, the quantization step average value first satisfies the transition condition 2 that is looser than the transition condition 4, and thus the state transitions to $S_{33}$ indicating a higher resolution. On the other hand, the transition condition 2 is not satisfied because the resolution of $S_{33}$ is out of the selection range at a very low bit rate that is not illustrated. In such a case, the frame rate transitions to $S_{41}$ indicating a higher frame rate upon satisfying the transition condition 4.

Furthermore, when none of the transition conditions 1 and 2 is satisfied (No at Step 310), the resolution/frame rate selecting circuit 109 outputs the resolution selection signal S18 indicating a value of the resolution indicated by the current state ID, and outputs the frame rate selection signal S19 indicating a value of the frame rate indicated by the current state ID. Furthermore, the resolution/frame rate selecting circuit 109 invalidates the resolution change indication signal S20 due to no change in the resolution.

Then, the resolution/frame rate selecting circuit 109 determines whether or not all the frames are coded (Step 323). When a frame to be coded remains (No at Step 323), the aforementioned processes (Steps 300 to 322) are executed for the next frame. On the other hand, when all the frames are coded (Yes at Step 323), the processes end. In other words, the processes are repeatedly executed until all the frames are coded.

When coding the first frame in the video signal S10 fed to the video input terminal 100, the moving image coding apparatus 10 having the aforementioned configuration outputs the resolution selection signal S18 indicating a resolution indicated by an initial state ID preset to the resolution/frame rate selecting circuit 109, and the frame rate selection signal S19 indicating a frame rate indicated by the initial state ID.

The resolution changing circuit 101 changes the resolution of an image that is indicated by the obtained video signal S10 to the resolution specified by the resolution selection signal S18, and outputs the video signal S11 indicating the image in which the resolution has been changed. The frame rate changing circuit 102 changes the frame rate of an image that is indicated by the obtained video signal S11 to the frame rate specified by the frame rate selection signal S19, and outputs the video signal S12 indicating the image in which the frame rate has been changed. Furthermore, when the frame to be coded is the first frame, the quantization step control circuit 106 outputs the quantization step signal S16 indicating the initial quantization step value.

The moving image coding apparatus 103 codes the video signal S12, and outputs it as the bit stream S13 to the bit stream output terminal 104. Here, when the frame to be coded is the first frame, the moving image coding circuit 103 selects intra prediction mode.

When the moving image coding apparatus 103 finishes coding the first frame in the stream, the quantization step control circuit 106 can know the code amount of the frame. Then, the quantization step control circuit 106 determines the quantization step value of the next frame, from the target bit rate information included in the coding bit rate signal S14 and the frame rate information included in the frame rate selection signal S19. Here, the target bit rate information included in the coding bit rate signal S14 may be a value calculated using (i) the bit rate set by the user or the manager of a device at the start of the communication or (ii) the highest bit rate that can be communicated in a network and is calculated using a packet loss rate, etc. notified from an image decoding apparatus after the moving image coding apparatus 10 actually transmits a coded bit stream through a transmission channel.

Although the quantization step value of the next frame is fed to the quantization step averaging circuit 107, the quantization step averaging circuit 107 neither calculates the quantization step average value nor updates the quantization step average value to be output until a predetermined number of frames have passed with respect to the first frame in the stream. Since the first frame in the stream is coded using intra prediction, the resulting code amount is larger than that in the case where intra prediction mode and inter prediction mode are adaptively used in frames other than the first frame in the stream. Thus, the predetermined number of frames needs to be processed until the quantization step value output from the quantization step control circuit 106 becomes stable.

Similarly, the resolution/frame rate selecting circuit 109 outputs the resolution selection signal S18 indicating the resolution indicated by the initial state ID, and the frame rate selection signal S19 indicating the frame rate indicated by the initial state ID, until the predetermined number of frames have passed with respect to the first frame in the stream. Thus, until the predetermined number of frames have passed with respect to the first frame in the stream, the resolution/frame rate selecting circuit 109 continues to adjust only the code amount using the quantization step.

After the predetermined number of frames have passed with respect to the first frame in the stream, the resolution/frame rate selecting circuit 109 compares the transition condition 1 or 2, with the quantization step average value included in the quantization step average value signal S17, which enables the state transition.

More specifically, when the quantization step average value is larger than the value indicated by the transition condition 1 and the resolution at a transition destination falls within the resolution selection range, the state transitions in a direction that the frame rate or the resolution decreases. On the other hand, when the quantization step average value is smaller than the value indicated by the transition condition 2 and the resolution at a transition destination falls within the resolution selection range, the state transitions in a direction that the frame rate or the resolution increases.

The resolution range selecting circuit 108 determines the resolution selection range by setting an upper limit and a lower limit of the resolution according to the coding bit rate value. A high resolution range is set in the case of a high bit rate, whereas a low resolution range is set in the case of a low bit rate.

As described above, even when the difficulty in compressing a video signal is considerably changed, a resolution will not be temporarily changed to a low resolution even at a high bit rate by setting a condition of a resolution range for a state transition. Similarly, the resolution will not be temporarily changed to a high resolution even at a low bit rate. As a result, the resolution can be stably changed.

Next, when a resolution is changed according to the state transition in the resolution/frame rate selecting circuit 109, the resolution/frame rate selecting circuit 109 validates the resolution change indication signal S20. As a result, the moving image coding circuit 103 selects intra prediction mode for the first frame in which the resolution has been changed. This operation is a measure caused by the difficulty in referring to a previous frame according to change in the resolution.

The quantization step averaging circuit 107 neither calculates the quantization step average value nor updates the quantization step average value to be output until a predetermined number of frames have passed and/or a predetermined time period has passed, since the resolution is changed. Furthermore, the resolution/frame rate selecting circuit 109 prohibits the state transition and holds a state ID immediately after the resolution is changed, until the predetermined number of frames have passed and/or the predetermined time period has passed since the resolution is changed. In other words, the resolution and the frame rate immediately after the resolution is changed are held, and only the code amount continues to be controlled.

Since one frame immediately after the resolution is changed is coded using intra prediction as in the first frame of the stream, the resulting code amount is larger than that in the case where intra prediction mode and inter prediction mode are adaptively used. As a result, since the quantization step value output from the quantization step control circuit 106 becomes unstable, the predetermined number of frames needs to be processed until the quantization step value becomes stable.

The moving image coding apparatus 10 according to Embodiment 1 includes the resolution changing circuit 101 that dynamically changes the resolution of an input moving image, the frame rate changing circuit 102 that adaptively skips the number of frames of the moving image output from the resolution changing circuit 101, and the moving image coding circuit 103 that codes the moving image output from the frame rate changing circuit 102 to generate a coded bit stream at a required coding bit rate.

In the process of dynamically changing the resolution, the maximum resolution and the minimum resolution are selected from among resolutions according the coding bit rate, and an output resolution for the resolution changing circuit 101 is selected from among resolutions in a range between the maximum resolution and the minimum resolution. In other words, when the degree of difficulty in compressing an input moving image or the target coding bit rate is considerably changed, an appropriate resolution is selected according to the target coding bit rate, from within a constraint range between the maximum resolution and the minimum resolution.

As a result, when the compression rate increases as in simple video on a PC screen, a considerably high resolution is not selected. Furthermore, when the compression rate decreases as when a camera is panned or tilted, a considerably low resolution is not selected. Thereby, the resolution within an appropriate range can be stably selected, and with the dynamically stable selection of the resolution, it is possible to obtain a stable image quality that does not cause any uncomfortable feeling.

Embodiment 2

The present invention may be implemented not only as the moving image coding apparatus 10 and the moving image coding method as described in Embodiment 1 but also as a program causing a computer to execute the moving image coding method according to Embodiment 1.

Figure 15A:
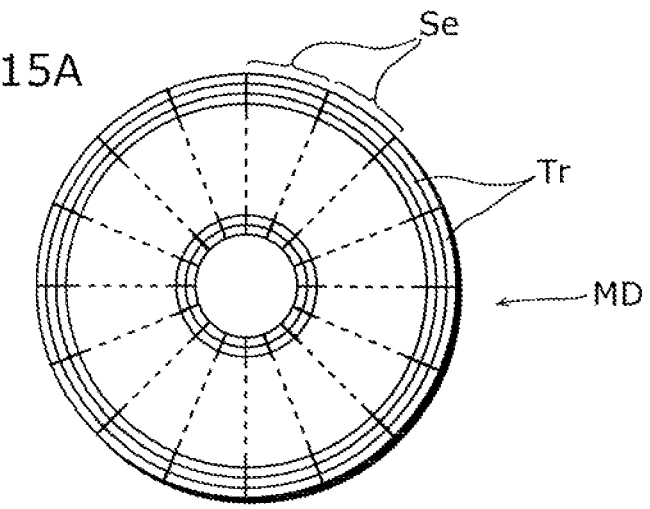
FIG. 15A illustrates an example of a physical format of a magnetic disk that is a recording medium body.
Figure 15B:
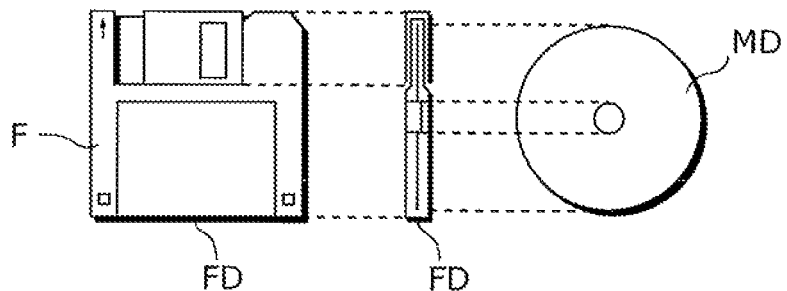
FIG. 15B illustrates a front view and a sectional view of a case for holding a magnetic disk, and the magnetic disk.
Figure 15C:
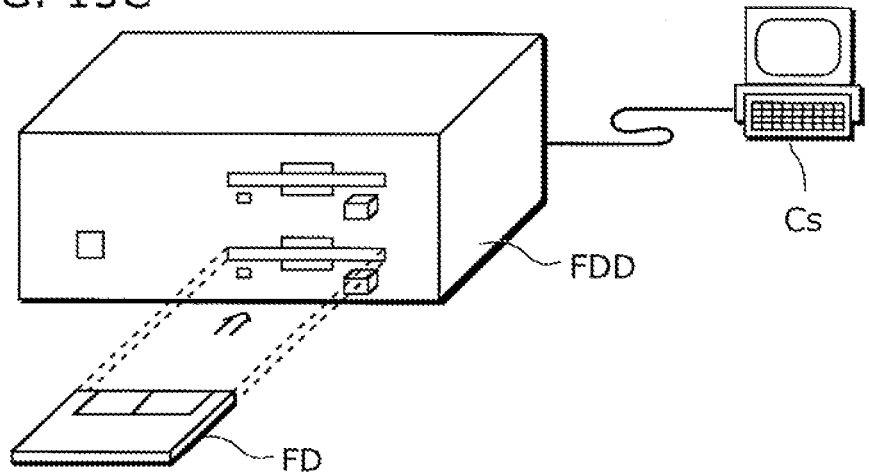
FIG. 15C illustrates a configuration for recording a program on a flexible disk and reproducing the program from the flexible disk.

FIGS. 15A to 15C illustrate a case where the moving image coding method according to Embodiment 1 is implemented by a computer system using a flexible disk FD on which the moving image coding method is stored.

FIG. 15 illustrates an example of a physical format of a magnetic disk MD that is a recording medium body. FIG. 15B illustrates a front view and a sectional view of a case F for holding the magnetic disk MD, and the magnetic disk MD. FIG. 15C illustrates a configuration for recording the program on the flexible disk FD and reproducing it from the flexible disk FD.

The flexible disk FD includes the magnetic disk MD that is the recording medium body, and the case F for holding the magnetic disk MD. The disk MD has a surface where tracks Tr are formed concentrically from the outermost circumference toward the innermost circumference, and each of the tracks Tr is divided into 16 sectors Se in an angular direction. Thus, the moving image coding method as the program is recorded in an allocated area on the magnetic disk MD included in the flexible disk FD on which the program is stored.

Furthermore, when the program is recorded on the flexible disk FD, the moving image coding method as the program is written from a computer system Cs to the flexible disk FD via a flexible disk drive FDD. Furthermore, when the moving image coding method is constructed in the computer system Cs using the program in the flexible disk FD, the program is read from the flexible disk FD using the flexible disk drive FDD, and is transferred to the computer system Cs.

Although the flexible disk FD is used as a recording medium in the description, an optical disc may be used instead. Furthermore, the recording medium is not limited to such. As long as the program is recorded, any recording medium may be used, such as an IC card and a ROM cassette.

Furthermore, according to the present invention, a part or all of the constituent elements included in the moving image coding apparatus 10 may be configured from a single System-LSI (Large-Scale Integration). The System-LSI is a super-mufti-function LSI manufactured by integrating constituent units on one chip.

Furthermore, out of the functional blocks, only a means for storing data to be coded may be separately configured without making it into one chip.

Embodiment 3

The program for implementing the configuration of the image coding method according to Embodiments 1 and 2 is recorded on a recording medium, so that the processes described in Embodiments 1 and 2 can be easily implemented by an independent computer system. As long as the program can be recorded, any recording medium may be used, such as a magnetic disk, an optical disc, an optical magnetic disk, an IC card, and a semiconductor memory.

Hereinafter, the applications to the image coding method described in Embodiments 1 and 2 and a system using the same will be described.

Figure 16:
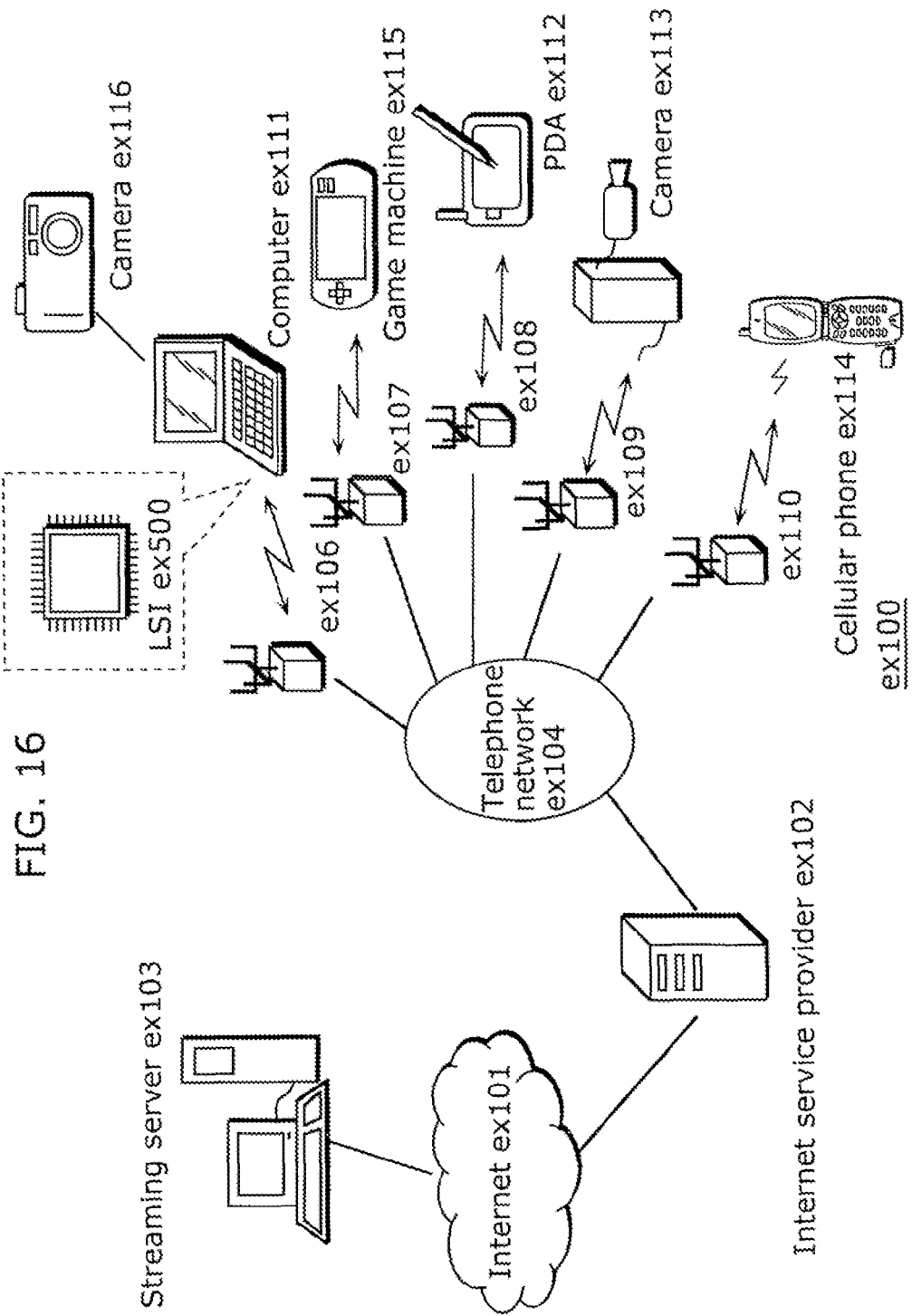
FIG. 16 schematically illustrates an overall configuration of a content providing system for implementing content distribution services.

FIG. 16 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 16, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and/or moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by a Large Scale Integration (LSI) ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers or computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Each of the devices included in the content providing system ex100 may perform coding using the image coding method described in Embodiment 1.

The cellular phone ex114 will be described as an example of such a device.

Figure 17:
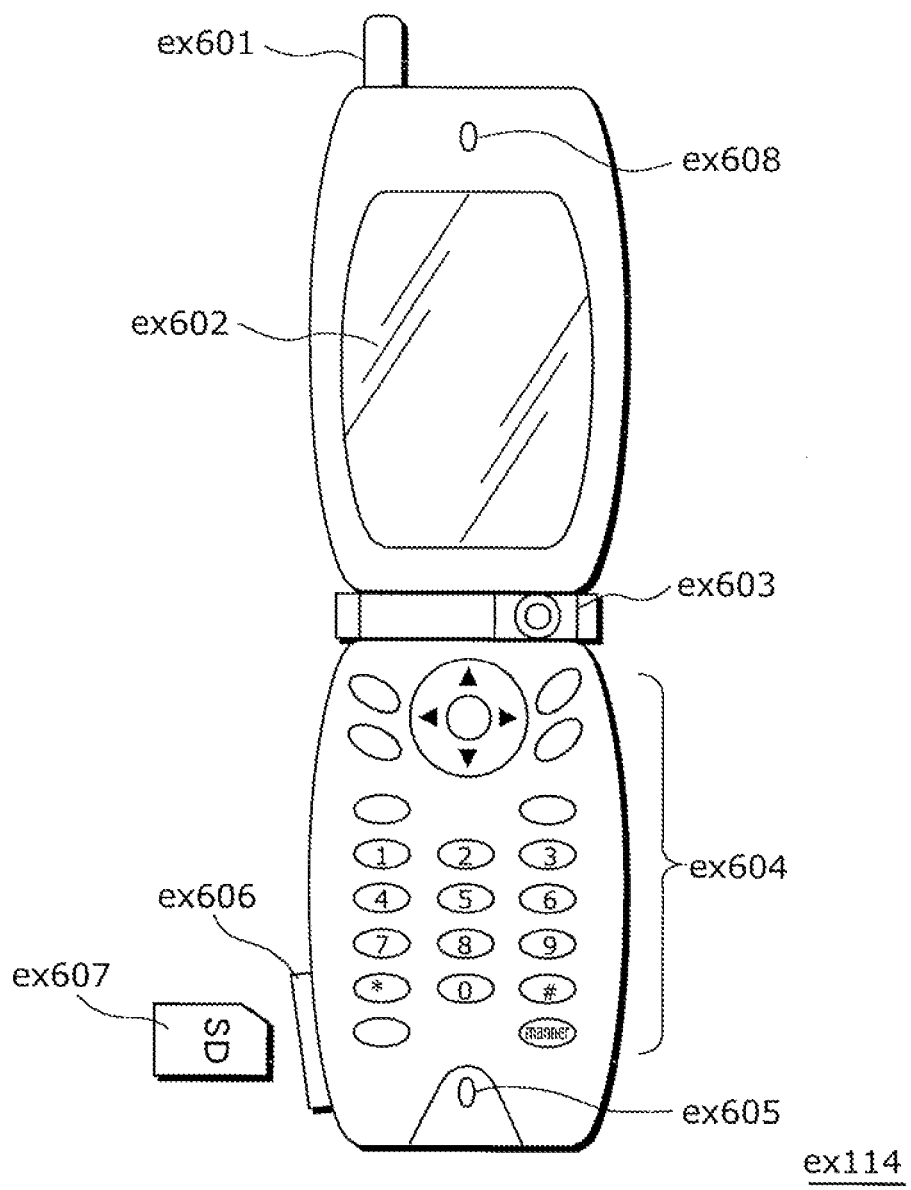
FIG. 17 illustrates an external view of a cellular phone.

FIG. 17 illustrates the cellular phone ex114 that uses the image coding method described in Embodiment 1. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EEPROM) which is a non-volatile memory that is electrically rewritable and erasable.

Figure 18:
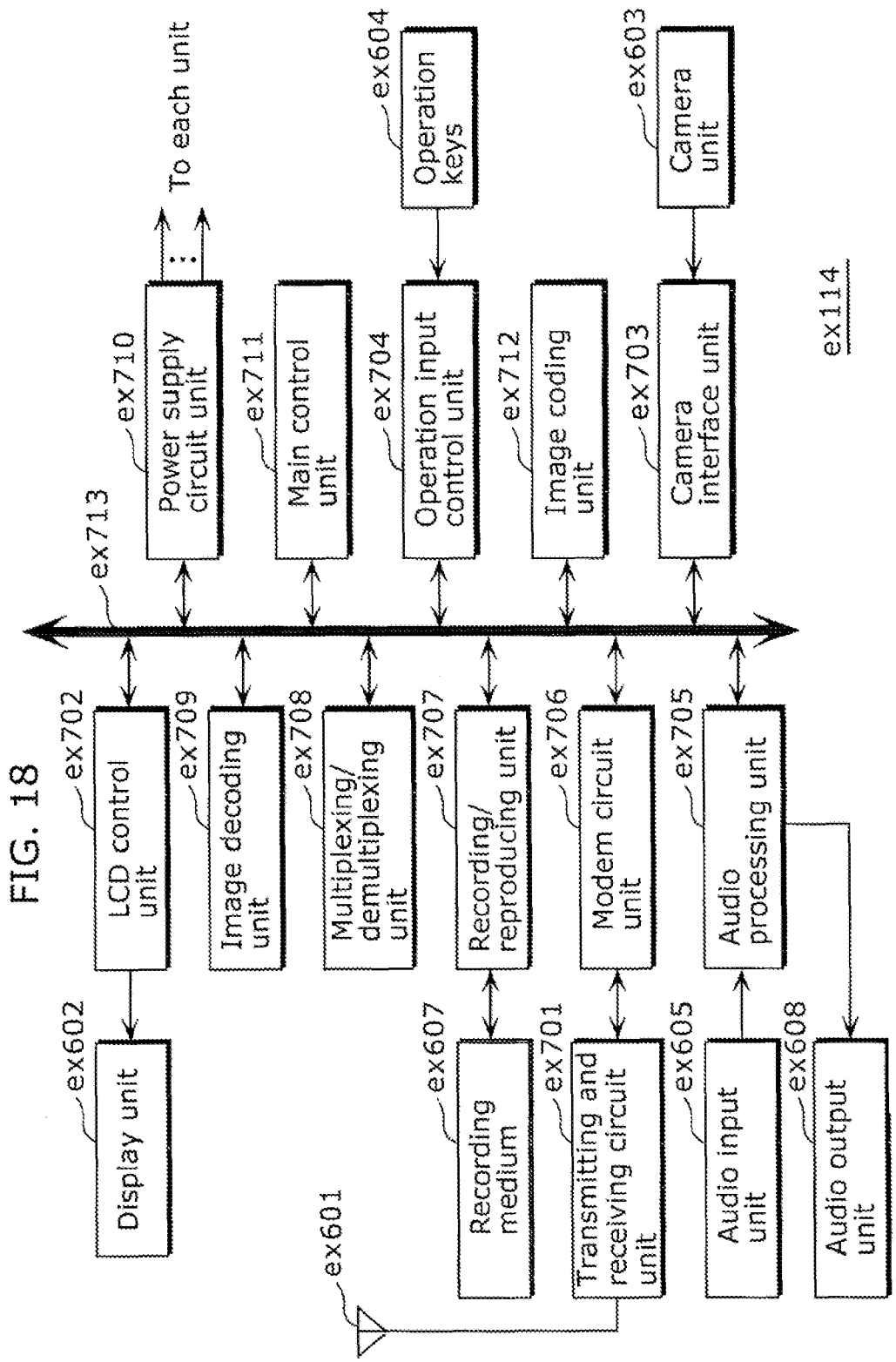
FIG. 18 is a block diagram illustrating an example of a configuration of a cellular phone.

Next, the cellular phone ex114 will be described with reference to FIG. 18. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key or a power key is turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. In addition, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the image coding unit ex712 via the camera interface unit ex703. Furthermore, when the image data is not transmitted, the image data captured by the camera unit ex603 can be displayed directly on the display unit ex602 via the camera interface unit ex703 and the LCD control unit ex702.

The image coding unit ex712 including the image coding apparatus as described for the present invention compresses and codes the image data supplied from the camera unit ex603 using the coding method employed by the image coding apparatus as shown in Embodiment 1 so as to transform the data into coded image data, and sends the data out to the multiplexing/demultiplexing unit ex708. Furthermore, the cellular phone ex114 simultaneously sends out, as digital audio data, the audio collected by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. After the digital-to-analog conversion and frequency conversion on the data, the transmitting and receiving circuit unit ex701 transmits the resulting data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bit stream of image data and that of audio data, and supplies the coded image data to the image decoding unit ex709 and the audio data to the audio processing unit ex705, respectively via the synchronous bus ex713.

Next, the image decoding unit ex709 including the image decoding apparatus decodes the bit stream of the image data using a decoding method corresponding to the coding method as shown in Embodiment 1 so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 19:
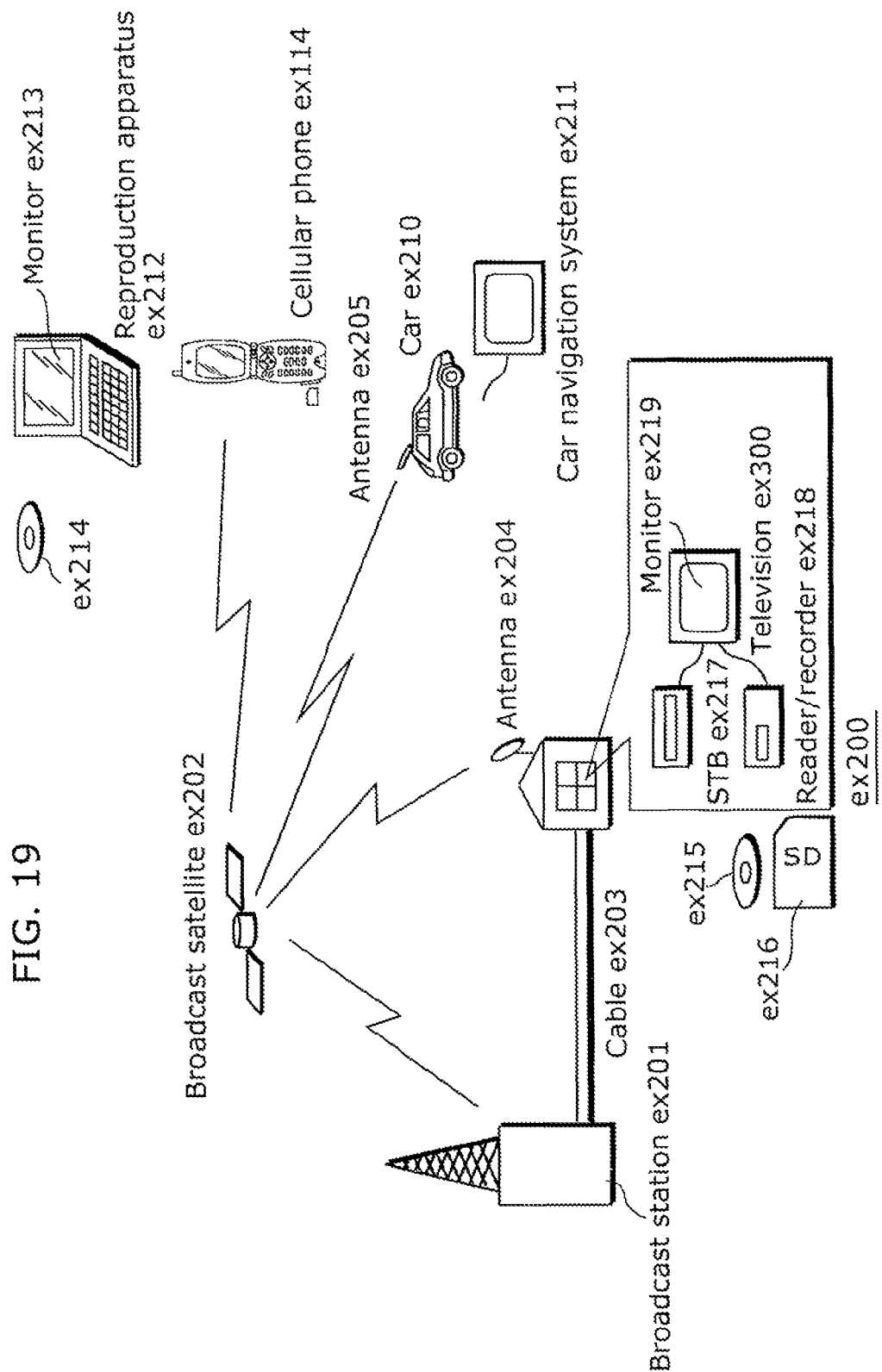
FIG. 19 schematically illustrates an example of an overall configuration of a digital broadcasting system.

The present invention is not limited to the above-mentioned system because terrestrial or satellite digital broadcasting has been in the news lately, and at least the image coding apparatus described in Embodiment 1 can be incorporated into a digital broadcasting system as shown in FIG. 19. More specifically, a broadcast station ex201 communicates or transmits, via radio waves to a broadcast satellite ex202, audio data, video data, or a bit stream obtained by multiplexing the audio data and the video data. Upon receipt of the bit stream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217 decodes a coded bit stream and reproduces the decoded bit stream. Furthermore, a reader/recorder ex218 that reads and decodes such a bit stream obtained by multiplexing image data and audio data that are recorded on recording media ex215 and 216, such as a CD and a DVD may include an image decoding apparatus. In this case, the reproduced video signals are displayed on the monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300. Also, a car ex210 having an antenna ex205 can receive signals from the satellite ex202 or the base station ex201 for reproducing video on a display device such as a car navigation system ex211 set in the car ex210.

Furthermore, the image coding apparatus as shown in Embodiment 1 can be implemented in the reader/recorder ex218 (i) for reading and decoding the video data, the audio data, or the coded bit stream obtained by multiplexing the video data and the audio data, or (ii) for coding the video data, the audio data, or the coded bit stream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bit stream is recorded. For example, another reproduction apparatus ex212 can reproduce the video signals on a monitor ex213, using a recording medium ex214 on which the coded bit stream is copied.

Furthermore, it is also possible to implement the image decoding apparatus in the set top box ex217 connected to the cable ex203 for a cable television or the antenna ex204 for satellite and/or terrestrial broadcasting, so as to display the video signals on the monitor ex219 of the television ex300. The image decoding apparatus may be included not in the set top box but in the television ex300.

Figure 20:
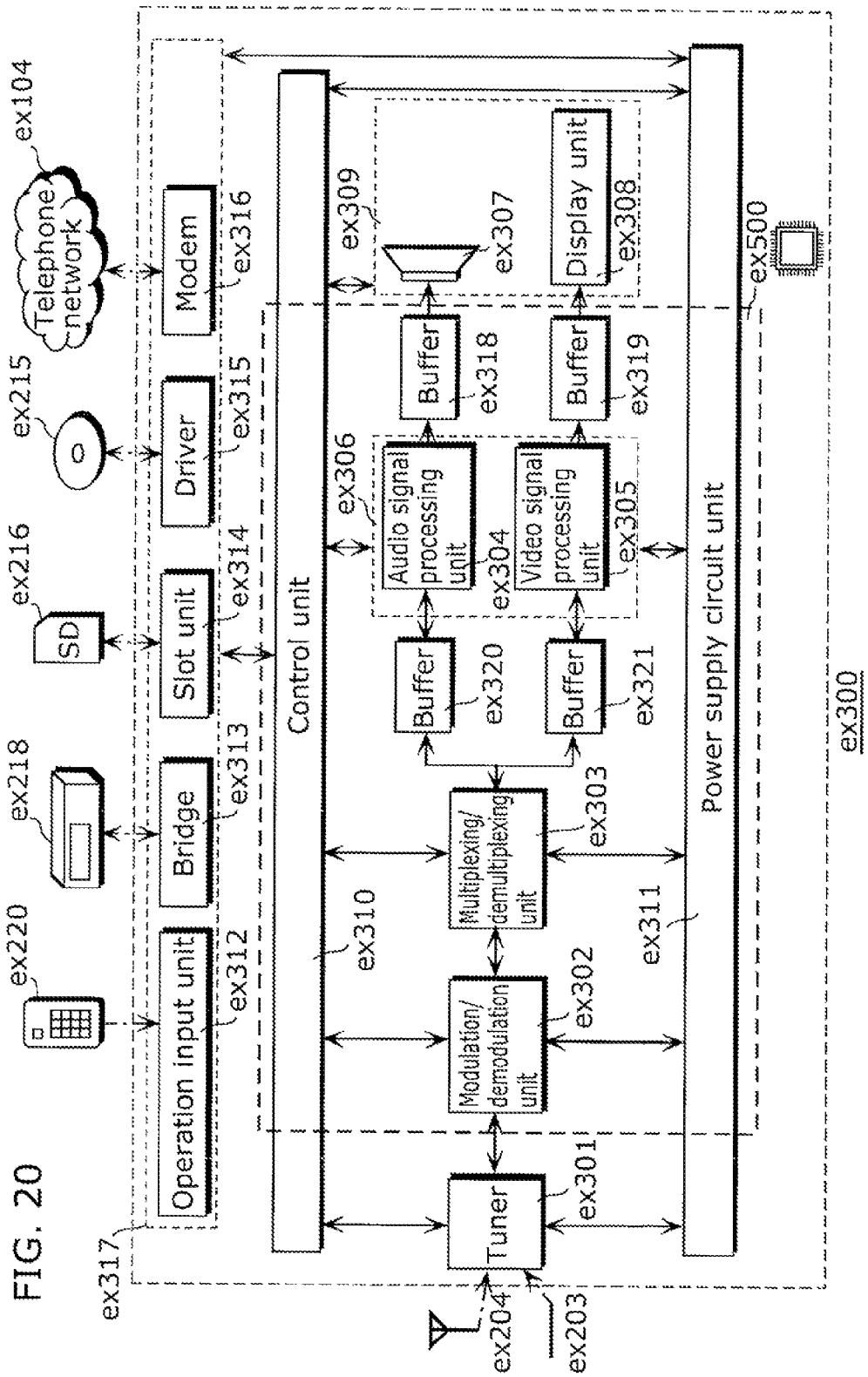
FIG. 20 is a block diagram illustrating an example of a configuration of a television.

FIG. 20 illustrates the television (receiver) ex300 that uses the image coding method described in Embodiment 1. The television ex300 includes: a tuner ex301 that obtains or provides a bit stream of video information through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. Furthermore, the television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disc, and a SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may not be capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may code the coded bit stream, and the television ex300 and the reader/recorder ex218 may share the coding.

Figure 21:
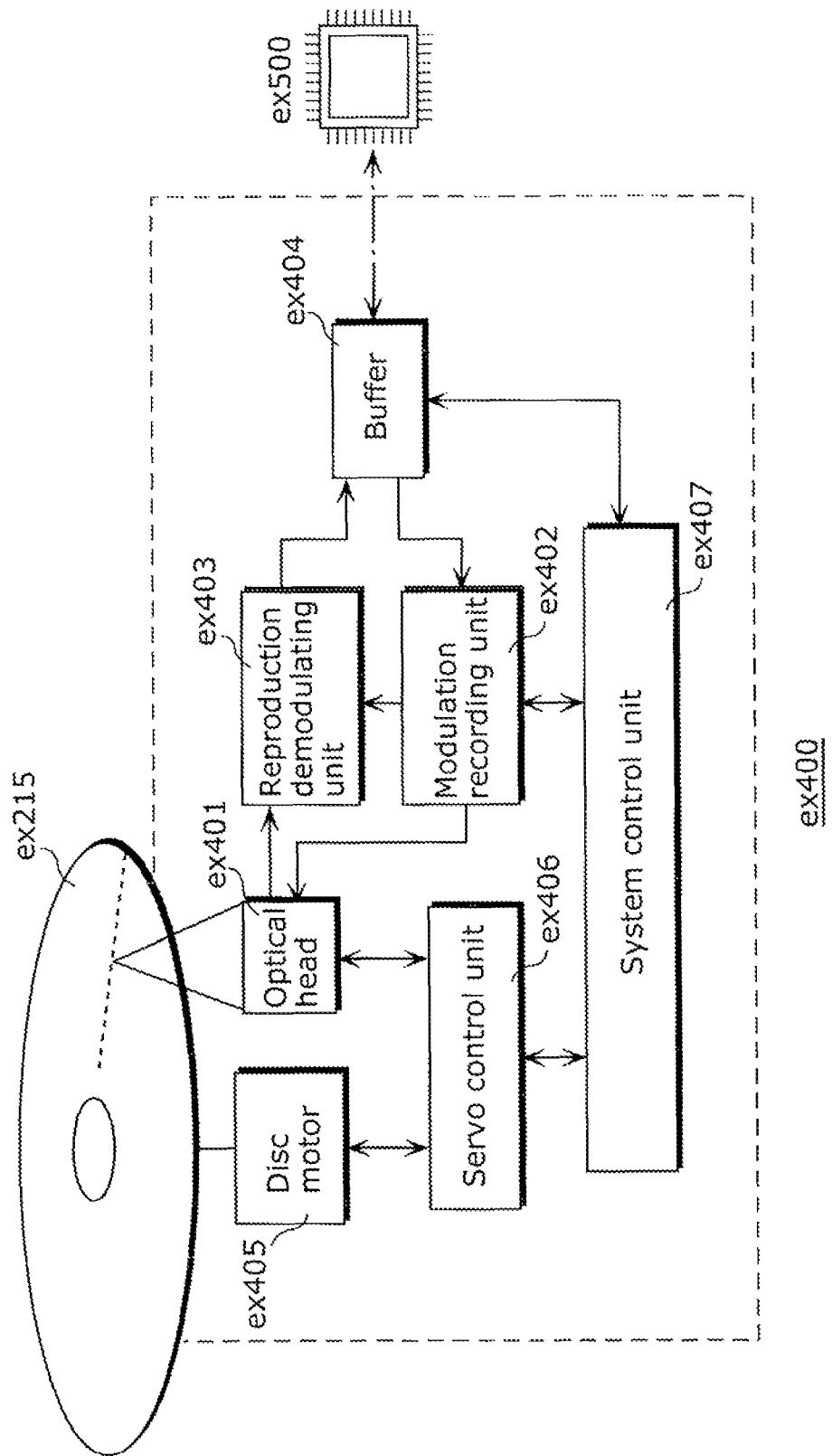
FIG. 21 is a block diagram illustrating an example of a configuration of an information reproducing/recording unit that reads and writes information from or on a recording medium that is an optical disc.

As an example, FIG. 21 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disc motor ex405 rotates the recording medium ex215. A servo control unit ex406 moves the optical head ex401 to a predetermined information track while controlling the rotation drive of the disc motor ex405 so as to follow the laser spot. The system control unit ex407 controls overall the information reproducing/recording unit ex400. The reading and writing processes can be implemented by the system control unit ex407 using various information held in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 22:
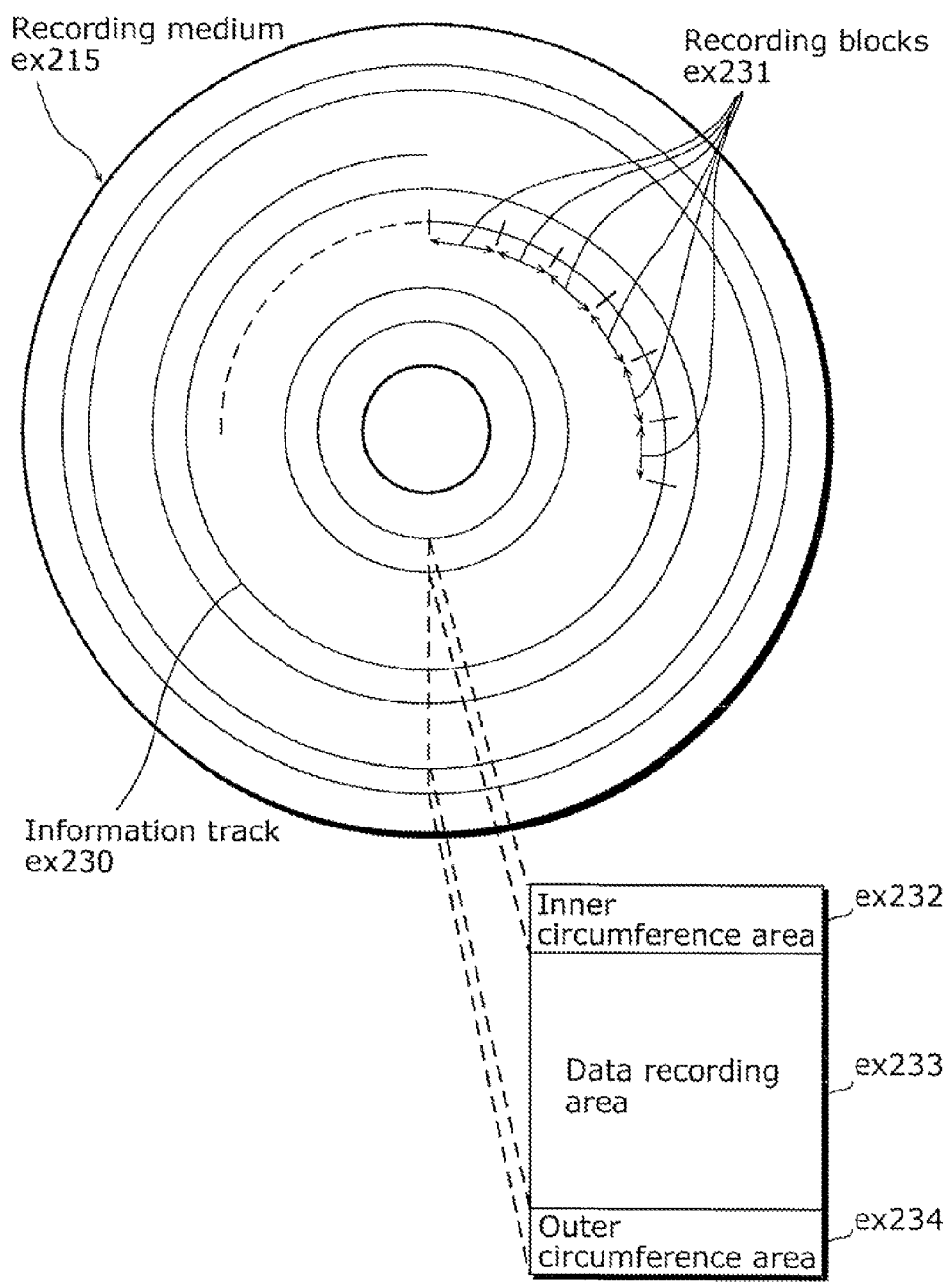
FIG. 22 illustrates an example of a configuration of a recording medium that is an optical disc.

FIG. 22 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and in the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 20. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method in Embodiment 1 can be used in any of the devices and systems described. Thus, the advantages described in Embodiments 1 and 2 can be obtained.

Furthermore, the present invention is not limited to Embodiments, and the various modifications and revisions are possible without departing from the scope of the present invention.

Embodiment 4

Figure 23:
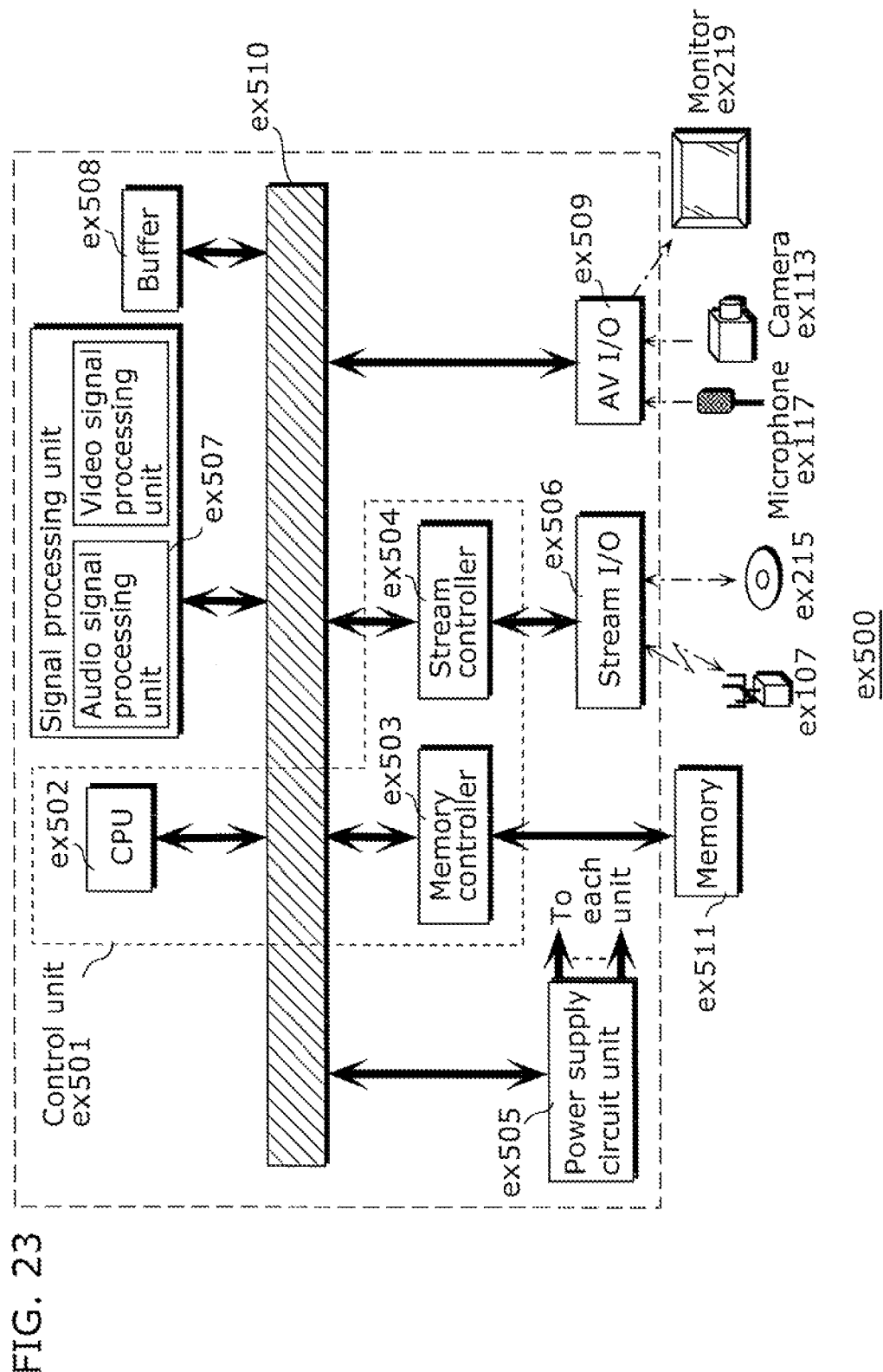
FIG. 23 is a block diagram illustrating an example of a configuration of an integrated circuit for implementing the image coding method and the image decoding method according to each of Embodiments.
Figure 24:
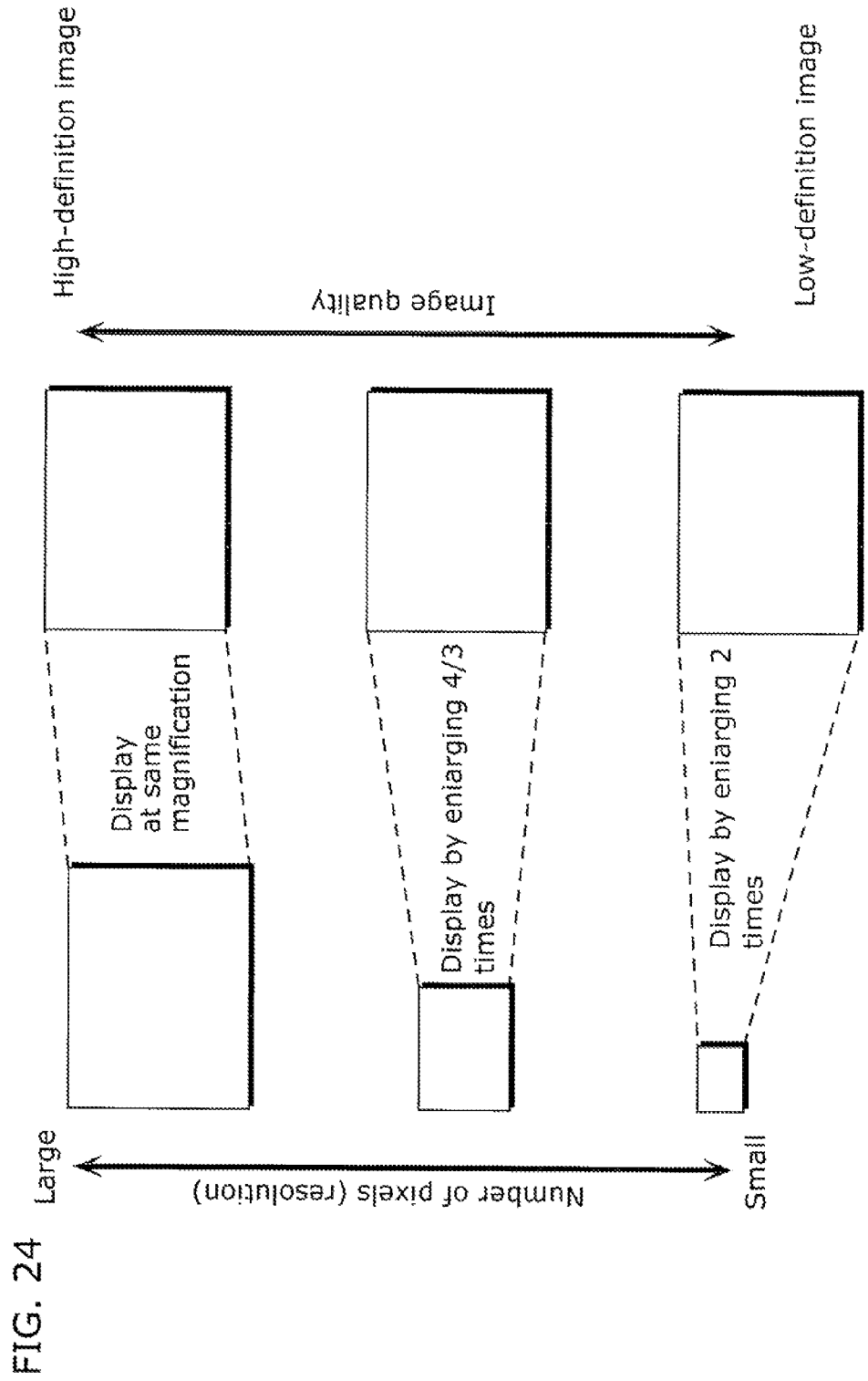
FIG. 24 illustrates relationships between conventional images to be coded and display images.
Figure 25:
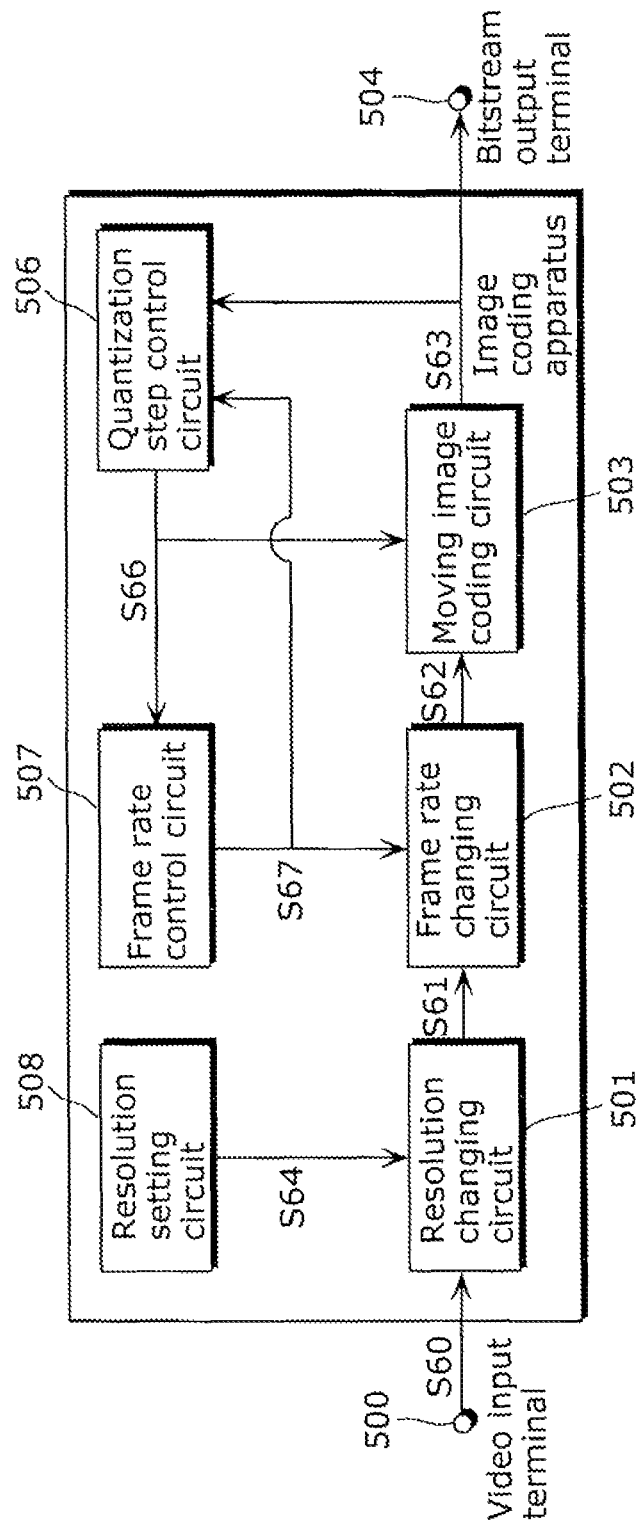
FIG. 25 illustrates a block diagram of a conventional moving image coding apparatus.

Each of the image coding method and the image coding apparatus in Embodiments 1 to 3 is typically achieved in the form of an integrated circuit or a LSI circuit. As an example, FIG. 23 illustrates a configuration of an LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bit stream is transmitted to a base station ex107, or written into the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the processing amount and speed as necessary. Then, the data portions are transmitted to the signal processing unit ex507. The signal processing unit ex507 decodes audio data and/or video data. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve the integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Although the image coding method and the image coding apparatus according to the present invention are described based on Embodiments 1 to 4, the present invention is not limited to these Embodiments. All modifications and other embodiments conceivable by those skilled in the art through arbitrarily combining the structural elements of different embodiments are intended to be included within the scope of the present invention.

Although the resolution area selecting circuit 108 in Embodiment 1 sets the maximum resolution and the minimum resolution, the resolution area selecting circuit 108 may set only the maximum resolution without any input of an image that is very difficult to be compressed, and may have a very low resolution.

Furthermore, although the resolution area selecting circuit 108 sets the maximum resolution and the minimum resolution according to the bit rate derived from the bit rate determining circuit 105, the setting method is not limited to such. The resolution area selecting circuit 108 may set the maximum resolution and the minimum resolution according to the bit rate explicitly set by the user.

INDUSTRIAL APPLICABILITY

The present invention is effectively applicable to a moving image coding apparatus that codes a moving image and transmits the coded image through a transmission channel, and the moving image coding method for the coding and transmitting.

REFERENCE SIGNS LIST

10 Moving image coding apparatus
20 Image converting unit
30 Moving image coding unit
40 Bit rate determining unit 50 Resolution range selecting unit
100, 200, 300, 400, 500 Video input terminal
101, 501 Resolution changing circuit
102, 502 Frame rate changing circuit
103, 503 Moving image coding circuit
104, 406, 504 Bit stream output terminal
105 Bit rate determining circuit
106, 506 Quantization step control circuit
107 Quantization step averaging circuit
108 Resolution range selecting circuit
109 Resolution/frame rate selecting circuit
110 Image converting unit
201 Frame rate selection signal input terminal
202, 303 Frame memory
203, 305 Write/read control circuit
204, 306 Video output terminal
301 Horizontal LPF circuit
302 Vertical LPF circuit
304 Resolution selection signal input terminal
401 Input image memory
402 Difference arithmetic circuit
403 Orthogonal transform circuit
404 Quantization circuit
405 Variable-length coding circuit
407 Quantization step input terminal
408 Inverse quantization circuit
409 Inverse orthogonal transform circuit
410 Addition arithmetic circuit
411 Reference image memory
412 Motion vector detecting circuit
413 Motion compensation circuit
414 Intra prediction circuit
415 Coding mode selection control circuit
416 Predictive image selector circuit
417 Resolution change indication signal input terminal
507 Frame rate control circuit
508 Resolution setting circuit
ex100 Content providing system
ex101 Internet
ex102 Internet service provider
ex103 Streaming server
ex104 Telephone network
ex106, ex107, ex108, ex109, ex110 Base station
ex111 Computer
ex112 PDA
ex113, ex116 Camera
ex114 Cellular phone equipped with camera (cellular phone)
ex115 Game machine
ex117 Microphone
ex200 Digital broadcasting system
ex201 Broadcast station
ex202 Broadcast satellite (satellite)
ex203 Cable
ex204, ex205, ex601 Antenna
ex210 Car
ex211 Car navigation system
ex212 Reproduction apparatus
ex213, ex219 Monitor
ex214, ex215, ex216, ex607 Recording medium
ex217 Set top box (STB)
ex218 Reader/recorder
ex220 Remote controller
ex230 Information track
ex231 Recording blocks
ex232 Inner circumference area
ex233 Data recording area
ex234 Outer circumference area
ex300 Television
ex301 Tuner
ex302 Modulation/demodulation unit
ex303 Multiplexing/demultiplexing unit
ex304 Audio signal processing unit
ex305 Video signal processing unit
ex306, ex507 Signal processing unit
ex307 Speaker
ex308, ex602 Display unit
ex309 Output unit
ex310, ex501 Control unit
ex311, ex505, ex710 Power supply circuit unit
ex312 Operation input unit
ex313 Bridge
ex314, ex606 Slot unit
ex315 Driver
ex316 Modem
ex317 Interface unit
ex318, ex319, ex320, ex321, ex404, ex508 Buffer
ex400 Information reproducing/recording unit
ex401 Optical head
ex402 Modulation recording unit
ex403 Reproduction demodulating unit
ex405 Disc motor
ex406 Servo control unit
ex407 System control unit
ex500 LSI
ex502 CPU
ex503 Memory controller
ex504 Stream controller
ex506 Stream I/O
ex509 AV IO
ex510 Bus
ex603 Camera unit
ex604 Operation keys
ex605 Audio input unit
ex608 Audio output unit
ex701 Transmitting and receiving circuit unit
ex702 LCD control unit
ex703 Camera interface unit (camera I/F unit)
ex704 Operation input control unit
ex705 Audio processing unit
ex706 Modem circuit unit
ex707 Recording/reproducing unit
ex708 Multiplexing/demultiplexing unit
ex709 Image decoding unit
ex711 Main control unit
ex712 Image coding unit
ex713 Synchronous bus

The invention claimed is:

1. A moving image coding method of coding an input image to generate a coded bit stream, and transmitting the coded bit stream through a transmission channel, said moving image coding method comprising:

changing at least one of a resolution and a frame rate of the input image, according to a degree of difficulty in coding the input image, and outputting an image to be coded;

coding the image outputted in said changing to generate the coded bit stream, and transmitting the coded bit stream through the transmission channel;

determining a coding bit rate that is a bit rate of the coded bit stream transmitted through the transmission channel; and selecting a resolution range for determining an upper limit of a resolution of the image to be coded according to the coding bit rate determined in said determining, wherein, when the resolution of the image to be coded is to be increased, a new resolution is determined in said changing so that the resolution of the image to be coded does not exceed the upper limit determined in said selecting, wherein, in said selecting, a lower limit of the resolution of the image to be coded is determined according to the coding bit rate determined in said determining, such that the upper limit of the resolution of the image to be coded is a different value than the lower limit of the resolution of the image to be coded, and wherein, when the resolution of the image to be coded is to be decreased, the new resolution is determined in said changing so that the resolution of the image to be coded does not fall below the lower limit determined in said selecting.

2. The moving image coding method according to claim 1, wherein, after changing the resolution of the image to be coded, the resolution of the image to be coded is not changed again in said changing at least until a predetermined time period has passed or until a predetermined number of input images including the input image have been processed.

3. The moving image coding method according to claim 1, wherein the coding bit rate is determined based on a bit rate that can be transmitted through the transmission channel, the bit rate being obtained by measuring an amount of a coded bit stream that has been actually transmitted and received between a transmitting apparatus and a receiving apparatus.

4. The moving image coding method according to claim 1, further comprising:

calculating a quantization step such that the coded bit stream has a code amount that enables transmission of the coded bit stream at the coding bit rate determined in said determining, and quantizing the image to be coded using the calculated quantization step in said coding; and calculating a quantization step average value that is an average value of the quantization steps calculated during a predetermined time period in said calculating of the quantization step, wherein said changing includes:

determining a resolution and a frame rate of the image to be coded by determining the degree of difficulty in coding the input image based on the quantization step average value calculated in said calculating of the quantization step average value;

changing the resolution of the input image to the resolution determined in said determining of the resolution and the frame rate; and changing the frame rate of the input image to the frame rate determined in said determining of the resolution and the frame rate.

5. The moving image coding method according to claim 4, wherein, in said determining of the resolution and the frame rate, at least one of a first resolution and a second resolution is held in advance, the first resolution being lower than a resolution determined immediately before, and the second resolution being higher than the resolution, wherein, in said changing of the resolution of the input image, the resolution of the input image is changed to the first resolution, when the quantization step average value calculated in said calculating of the quantization step average value is larger than a predetermined first threshold and when the first resolution that is held is equal to or larger than the lower limit, and wherein, in said changing of the resolution of the input image, the resolution of the input image is changed to the second resolution, when the quantization step average value calculated in said calculating of the quantization step average value is smaller than a predetermined second threshold and when the second resolution that is held is equal to or smaller than the upper limit.

6. The moving image coding method according to claim 4, wherein, in said determining of the resolution and the frame rate, at least one of a first frame rate and a second frame rate is held in advance, the first frame rate being lower than a frame rate determined immediately before, and the second frame rate being higher than the frame rate, wherein, in said changing of the frame rate of the input image, the frame rate of the input image is changed to the second frame rate, when the resolution of the input image is changed to a first resolution in said changing of the resolution of the input image, and wherein, in said changing of the frame rate of the input image, the frame rate of the input image is changed to the first frame rate, when the resolution of the input image is changed to a second resolution in said changing of the resolution of the input image.

7. The moving image coding method according to claim 5, wherein, in said determining of the resolution and the frame rate, at least one of a first frame rate and a second frame rate is held in advance, the first frame rate being lower than a frame rate determined immediately before, and the second frame rate being higher than the frame rate, wherein, in said changing of the frame rate of the input image, the frame rate of the input image is changed to the first frame rate, when the quantization step average value calculated in said calculating of the quantization step average value is larger than the predetermined first threshold and the first resolution that is held falls below the lower limit, and wherein, in said changing of the frame rate of the input image, the frame rate of the input image is changed to the second frame rate, when the quantization step average value calculated in said calculating of the quantization step average value is smaller than the predetermined second threshold and the second resolution that is held exceeds the upper limit.

8. A moving image coding apparatus that codes an input image to generate a coded bit stream, and transmits the coded bit stream through a transmission channel, said moving image coding apparatus comprising:

an image converting unit configured to change at least one of a resolution and a frame rate of the input image, according to a degree of difficulty in coding the input image, and to output an image to be coded;

a moving image coding unit configured to code the image outputted by said image converting unit to generate the coded bit stream, and to transmit the coded bit stream through the transmission channel;

a bit rate determining unit configured to determine a coding bit rate that is a bit rate of the coded bit stream transmitted through the transmission channel; and a resolution range selecting unit configured to select a resolution range for determining an upper limit of a resolution of the image to be coded according to the coding bit rate determined by said bit rate determining unit, wherein, when the resolution of the image to be coded is to be increased, said image converting unit is configured to determine a new resolution so that the resolution of the image to be coded does not exceed the upper limit determined by said resolution range selecting unit, wherein said resolution range selecting unit determines a lower limit of the resolution of the image to be coded according to the coding bit rate determined by said bit rate determining unit, such that the upper limit of the resolution of the image to be coded is a different value than the lower limit of the resolution of the image to be coded, and wherein, when the resolution of the image to be coded is to be decreased, the new resolution is determined by said image converting unit so that the resolution of the image to be coded does not fall below the lower limit determined by said resolution range selecting unit.

9. A non-transitory computer-readable recording medium for use in a computer, said non-transitory computer-readable recording medium having a program causing a computer to code an input image to generate a coded bit stream, and transmit the coded bit stream through a transmission channel, the program causing the computer to execute a method comprising:

changing at least one of a resolution and a frame rate of the input image, according to a degree of difficulty in coding the input image, and outputting an image to be coded;

coding the image outputted in said changing to generate the coded bit stream, and transmitting the coded bit stream through the transmission channel;

determining a coding bit rate that is a bit rate of the coded bit stream transmitted through the transmission channel; and selecting a resolution range for determining an upper limit of a resolution of the image to be coded according to the coding bit rate determined in said determining, wherein, when the resolution of the image to be coded is to be increased, a new resolution is determined in said changing so that the resolution of the image to be coded does not exceed the upper limit determined in said selecting, wherein, in said selecting, a lower limit of the resolution of the image to be coded is determined according to the coding bit rate determined in said determining, such that the upper limit of the resolution of the image to be coded is a different value than the lower limit of the resolution of the image to be coded, and wherein, when the resolution of the image to be coded is to be decreased, the new resolution is determined in said changing so that the resolution of the image to be coded does not fall below the lower limit determined in said selecting.

10. An integrated circuit that codes an input image to generate a coded bit stream, and transmits the coded bit stream through a transmission channel, said integrated circuit comprising:

an image converting unit configured to change at least one of a resolution and a frame rate of the input image, according to a degree of difficulty in coding the input image, and to output an image to be coded;

a moving image coding unit configured to code the image outputted by said image converting unit to generate the coded bit stream, and to transmit the coded bit stream through the transmission channel;

a bit rate determining unit configured to determine a coding bit rate that is a bit rate of the coded bit stream transmitted through the transmission channel; and a resolution range selecting unit configured to select a resolution range for determining an upper limit of a resolution of the image to be coded according to the coding bit rate determined by said bit rate determining unit, wherein, when the resolution of the image to be coded is to be increased, said image converting unit is configured to determine a new resolution so that the resolution of the image to be coded does not exceed the upper limit determined by said resolution range selecting unit, wherein said resolution range selecting unit determines a lower limit of the resolution of the image to be coded according to the coding bit rate determined by said bit rate determining unit, such that the upper limit of the resolution of the image to be coded is a different value than the lower limit of the resolution of the image to be coded, and wherein, when the resolution of the image to be coded is to be decreased, the new resolution is determined by said image converting unit so that the resolution of the image to be coded does not fall below the lower limit determined by said resolution range selecting unit.

11. The moving image coding method according to claim 4, wherein in said determining of the resolution and the frame rate, the degree of difficulty in coding the input image is determined to be higher as the quantization step average value calculated in said calculating of the quantization step average value is larger.

* * * * *